US012250762B2

(12) United States Patent
Teramoto

(10) Patent No.: US 12,250,762 B2
(45) Date of Patent: Mar. 11, 2025

(54) LIGHT SOURCE APPARATUS

(71) Applicant: Ushio Denki Kabushiki Kaisha, Tokyo (JP)

(72) Inventor: Yusuke Teramoto, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 140 days.

(21) Appl. No.: 17/987,145

(22) Filed: Nov. 15, 2022

(65) Prior Publication Data

US 2023/0317396 A1 Oct. 5, 2023

(30) Foreign Application Priority Data

Mar. 30, 2022 (JP) ................................ 2022-057607

(51) Int. Cl.
*H05G 2/00* (2006.01)

(52) U.S. Cl.
CPC ......... *H05G 2/0027* (2024.08); *H05G 2/0023* (2024.08); *H05G 2/008* (2013.01)

(58) Field of Classification Search
CPC ........ H05G 2/005; H05G 2/006; H05G 2/008; H05G 2/002; H05G 2/0027; H05G 2/0023
See application file for complete search history.

(56) References Cited

U.S. PATENT DOCUMENTS

| | | | | | |
|---|---|---|---|---|---|
| 3,360,306 | A * | 12/1967 | Vargady | G02B 21/241 16/89 |
| 10,672,584 | B2 | 6/2020 | Teramoto et al. | |
| 2019/0115184 | A1 * | 4/2019 | Zalubovsky | H01J 35/101 |
| 2019/0166679 | A1 * | 5/2019 | Vinokhodov | H05G 2/005 |

FOREIGN PATENT DOCUMENTS

| | | | |
|---|---|---|---|
| EP | 2203033 | B1 | 6/2010 |
| JP | 4893730 | B2 | 7/2010 |
| JP | 6658324 | B2 | 12/2017 |

* cited by examiner

*Primary Examiner* — Chih-Cheng Kao
(74) *Attorney, Agent, or Firm* — Yoshida & Associates LLC; Kenichiro Yoshida

(57) ABSTRACT

A light source apparatus, in which an energy beam transforms a liquid raw material into plasma to extract radiation, includes a rotation body, a raw material supply section, and a layer thickness adjustment section. The rotation body is disposed at a position onto which the energy beam is incident, and includes a groove overlapping with an incident area of the energy beam. The raw material supply section supplies the groove with the liquid raw material. The layer thickness adjustment section adjusts a layer thickness of the liquid raw material such that a front surface of the liquid raw material forms a concave surface in response to the groove in the incident area of the energy beam.

16 Claims, 10 Drawing Sheets

LIGHT SOURCE APPARATUS

CROSS-REFERENCE TO RELATED APPLICATION(S)

This application claims priority from Japanese Priority Patent Application No. 2022-057607 filed on Mar. 30, 2022. The entire teachings of the above application are incorporated herein by reference.

BACKGROUND ART

The present invention relates to a light source apparatus applicable to the emission of X-rays, extreme ultraviolet light, or the like.

X-rays have been conventionally used for medical, industrial, and research applications. In the medical field, X-rays are used for such applications as chest radiography, dental radiography, and computed tomography (CT). In the industrial field, X-rays are used for such applications as non-destructive testing and tomographic non-destructive testing to observe the inside of materials such as structures and welds. In the research field, X-rays are used for such applications as X-ray diffraction to analyze the crystal structure of materials and X-ray spectroscopy (X-ray fluorescence analysis) to analyze the constituent composition of materials.

X-rays can be generated using an X-ray tube, in which a pair of electrodes (anode and cathode) are provided. When a high voltage is applied between the anode and cathode while a cathode filament is being heated by flowing an electric current therethrough, negatively charged thermal electrons that are generated at the filament collide with a target on the anode surface at high speed, generating X-rays from the target. In X-ray tubes, a technique is also known in which the target on the anode is a liquid metal jet, and this target is irradiated with an electron beam to produce X-rays with high brightness.

Extreme ultraviolet light (hereinafter referred to as EUV light) having a wavelength of 13.5 nm, which is in the soft x-ray region having a relatively long wavelength among x-rays, has been recently used for exposure light. The substrate of a mask for EUV lithography, the mask being provided with fine patterns, is a reflective mirror having a stacked structure, which is provided with a multilayer film (e.g., molybdenum and silicon) for reflecting EUV light on a substrate made of low-thermal-expansion glass. The EUV mask is fabricated by patterning a material that absorbs radiation having a wavelength of 13.5 nm on the multilayer film.

The size of unacceptable defects in EUV masks is much smaller than that of conventional ArF masks, making its detection difficult. Hence, EUV masks are usually inspected using radiation having a wavelength that matches the wavelength operated on lithography, which is called an actinic inspection. For example, when performed using radiation having a wavelength of 13.5 nm, the actinic inspection can detect defects with a resolution better than 10 nm.

EUV light source apparatuses generally include DPP (Discharge Produced Plasma) light source apparatuses, LDP (Laser Assisted Discharge Produced Plasma) light source apparatuses, and LPP (Laser Produced Plasma) light source apparatuses. The DPP type EUV light source apparatus applies a high voltage between electrodes between which discharge gas containing EUV radiation species (plasma raw material in the gas phase) is supplied to generate a high-density high-temperature plasma by the discharge, utilizing the extreme ultraviolet light radiated from the plasma.

The LDP light source apparatus is an improved version of the DPP light source apparatus. In the DPP light source apparatus, for example, a liquid high-temperature plasma raw material such as Sn (tin) or Li (lithium) containing EUV radiation species is supplied to the surface of the electrode (discharge electrode) at which the discharge occurs. The raw material is then irradiated with an energy beam such as a laser beam or an electron beam to vaporize the material, and then a high-temperature plasma is generated by discharge.

The LPP light source apparatus generates plasma by focusing a laser beam on a droplet that has been ejected in a form of a minute liquid droplet, which is the target material for EUV radiation, and by exciting the target material. The droplet is made of materials including tin (Sn) or lithium (Li).

In this way, the DPP method (LDP method) light source apparatus or the LPP method light source apparatus can be used as an EUV light source apparatus that generates EUV light in the soft X-ray region. Meanwhile, since the DPP method (LDP method) light source apparatus uses discharge between the electrodes to generate plasma, debris caused by EUV raw materials is eventually likely to occur. In contrast, the LPP method light source apparatus is designed to use a minute droplet made of tin, which is the EUV raw material, as a target and to focus a laser beam for excitation onto the target, thus making the configuration of the light source apparatus complex. In addition, in the LPP method light source apparatus, it is difficult to stably drop and supply the tin droplets, making it difficult to stably generate EUV light.

Japanese Patent No. 6658324 discloses a method in which a liquid target material for generating X-rays is applied to disk-shaped rotation bodies and the applied liquid material is irradiated with an energy beam (laser beam) to generate X-rays. This method is capable of obtaining high-brightness X-rays with a relatively simple configuration. Applying the method described in Japanese Patent No. 6658324 to an EUV light source apparatus corresponds to the LPP method. However, this method eliminates the need for supplying the EUV raw material in liquid in a form of a droplet. Hence, this method is capable of readily supplying the EUV material and enables the liquid EUV material to be reliably irradiated with a laser beam, obtaining EUV radiation with a relatively simple configuration.

SUMMARY OF THE INVENTION

When raw materials are vaporized using an energy beam to generate plasma, the spatial expansion of the vaporized raw materials and other factors may affect the intensity of the radiation. For example, Japanese Patent No. 4893730 discloses the LDP light source apparatus in which a raw material is vaporized by an energy beam between two discharge electrodes, and a high voltage is applied to each electrode to generate plasma. During this process, forming a recess on the surface of the vaporized raw material using an energy beam and a rod-shaped member suppresses the spatial expansion of the vaporized raw material, efficiently generating discharge plasma.

In contrast, Japanese Patent No. 4893730 discloses the LPP method using a rotation body, in which a liquid raw material is vaporized by an energy beam, and the vaporized raw material is continuously irradiated with the energy beam for heating and exciting the material to generate a high-temperature plasma. If the density of this high-temperature plasma is low, luminous efficiency may decrease. Hence, there is a need for technology to improve the luminous efficiency of the plasma generated by an energy beam.

In view of the above circumstances, it is desirable to provide a light source apparatus capable of improving the luminous efficiency of the plasma generated by an energy beam.

In order to achieve the above-mentioned purpose, a light source apparatus according to one embodiment of the present invention, in which an energy beam transforms a liquid raw material into plasma to extract radiation, includes a rotation body, a raw material supply section, and a layer thickness adjustment section. The rotation body is disposed at a position onto which the energy beam is incident, and includes a groove overlapping with an incident area of the energy beam. The raw material supply section supplies the groove with the liquid raw material. The layer thickness adjustment section adjusts a layer thickness of the liquid raw material such that a front surface of the liquid raw material forms a concave surface in response to the groove in the incident area of the energy beam.

In this light source apparatus, the rotation body disposed at the location onto which the energy beam is incident is provided with the groove in a manner that the groove overlaps with the incident area of the energy beam, and a liquid raw material is supplied to the groove. The layer thickness of the liquid raw material is adjusted, and the front surface of the liquid raw material forms a concave surface in response to the groove in the incident area of the energy beam. This concave surface regulates the direction of expansion of the raw material when it vaporizes, thereby improving the luminous efficiency of the plasma generated by the energy beam.

The groove may be provided at a position facing a rotation axis of the rotation body.

The rotation body may include a disk-shaped rotation main body. In this case, the groove may be provided on one main surface of the rotation main body.

The groove may include an annular groove with a triangular, a rectangular, or an arc cross-sectional shape along a radial direction of the rotation main body.

The layer thickness adjustment section may include a skimmer that is fixed at a position directly above the groove and independently of the rotation body, and that skims off part of the liquid raw material rotating with the rotation body.

The skimmer may include a member having a channel structure that sandwiches an outer edge of the rotation body.

The skimmer may be disposed to be in contact with a front surface of the rotation body provided with the groove.

The layer thickness adjustment section may include a rotation controller that controls a drive section that rotates the rotation body.

The rotation body may include a disk-shaped rotation main body and a cover that is disposed at a position with a predetermined spacing from one main surface of the rotation main body, and that includes an annular opening through which the energy beam passes.

The groove may be provided in the main surface of the rotation main body above which the cover is disposed. In this case, the opening of the cover may be disposed to overlap the groove.

The main surface of the rotation main body above which the cover is disposed may include a flat surface. In this case, the groove may include the opening of the cover.

An opening width of the groove may be set in a range from 1 to 10 times as large as a spot size of the energy beam.

The rotation body may include an inner circumferential face surrounding a rotation axis thereof. In this case, the groove may be provided on the inner circumferential face.

The light source apparatus may further include a case that accommodates the rotation body, and that includes an opening through which the energy beam and the radiation pass.

The radiation may include X-rays or extreme ultraviolet light.

The light source apparatus according to the present invention is capable of improving the luminous efficiency of the plasma generated by an energy beam.

DETAILED DESCRIPTION OF THE EMBODIMENTS

Hereinafter, embodiments according to the present invention will be described with reference to the accompanying drawings.

Basic Configuration of Light Source Apparatus

Figure 1:
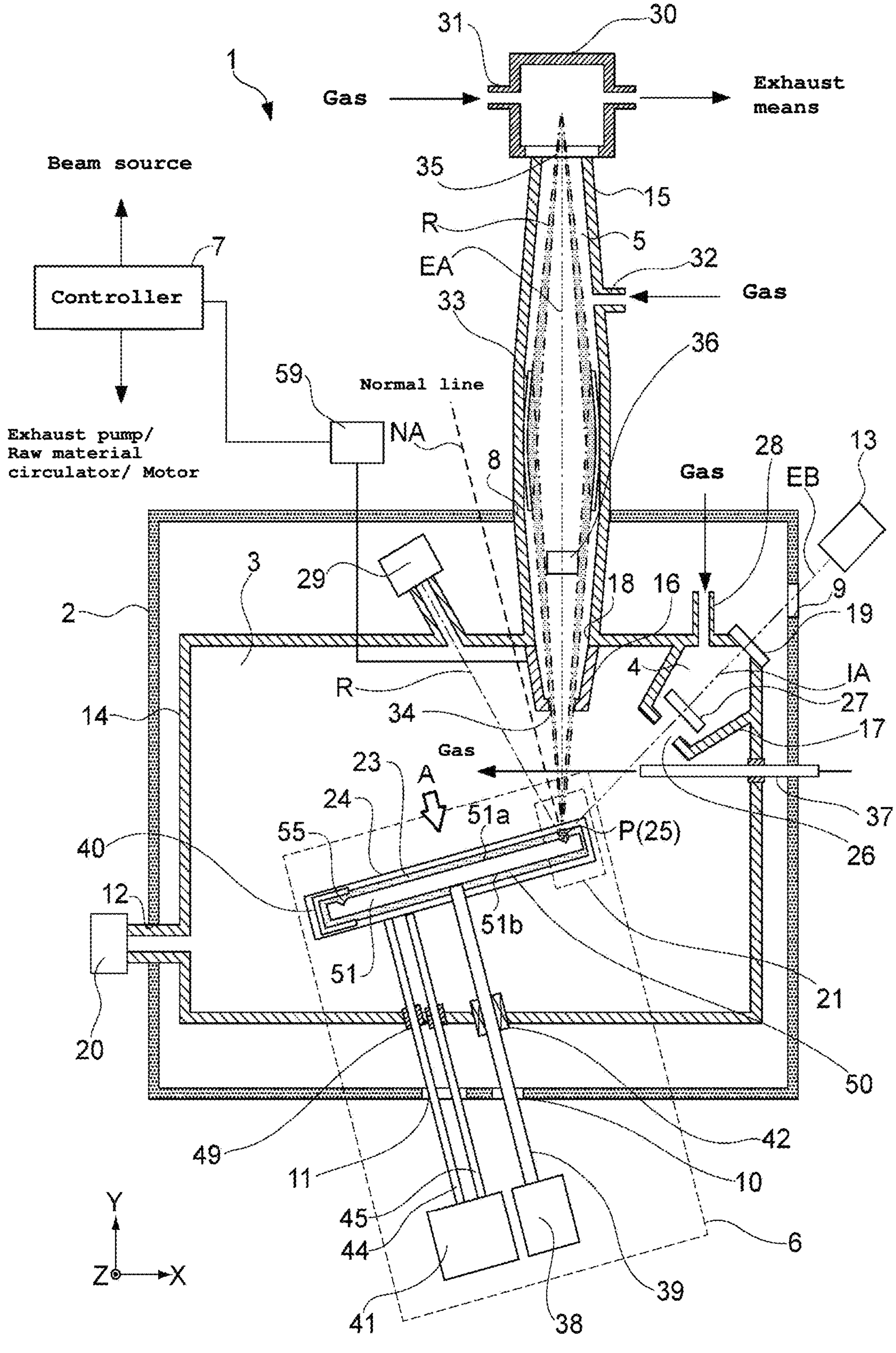
FIG. 1 is a schematic diagram illustrating a configuration example of a light source apparatus according to a first embodiment of the present invention.

FIG. 1 is a schematic diagram illustrating a configuration example of a light source apparatus according to a first embodiment of the present invention. FIG. 1 illustrates a schematic cross section of the light source apparatus 1 when the light source apparatus 1 is cut along the horizontal direction at a predetermined height from its installation surface and viewed from above. In FIG. 1, the illustration of the cross section is omitted for portions for which the configuration of the cross section does not need to be explained in order to facilitate the understanding of the configuration and operation of the light source apparatus 1. Hereinafter, the X direction is denoted as the left-right direction (the positive side of the X axis is the right side and the negative side is the left side), the Y direction is denoted as the front-rear direction (the positive side of the Y axis is the front side and the negative side is the rear side), and the Z direction is denoted as the height direction (the positive side of the Z-axis is the upper side, and the negative side is the lower side). Obviously, the application of the present technology is not limited to the orientation in which the light source apparatus 1 is used.

The light source apparatus 1 is a light source apparatus of the LPP method in which an energy beam EB transforms plasma raw material 23 into plasma to extract radiation R. The light source apparatus 1 is capable of emitting the radiation R ranging from hard X-rays having a wavelength of 30 nm or less to soft X-rays (including EUV light), for example. Hence, the light source apparatus 1 can be used as an X-ray generator or an EUV light source apparatus (EUV radiation generator). Obviously, the present technology can also be applied to light source apparatuses that emit radiation in other wavelength bands.

The light source apparatus 1 includes an enclosure 2, a vacuum chamber 3, an energy beam incident chamber 4, a radiation emission chamber 5, a raw material supply mechanism 6, and a controller 7. The enclosure 2 is configured such that its external shape is approximately a cube. The enclosure 2 includes an emission hole 8 formed in the front face of the enclosure 2, an incident hole 9 formed in the right side face thereof, two through-holes 10 and 11 formed in the rear face thereof, and a through-hole 12 formed in the left side face thereof. The enclosure 2 can be made of any materials; for example, the enclosure is made of metal.

In the present embodiment, the radiation R is set to allow its emission axis EA to pass through the emission hole 8 in the front face and extend in the Y-direction (front-rear direction). The radiation R such as X-rays and EUV light is extracted along the emission axis EA and emitted through the emission hole 8 toward the front side. In the present embodiment, the energy beam EB is set to allow an incident axis IA to extend from the incident hole 9 in the right side face toward the rear side at an oblique angle to the left. As shown in FIG. 1, a beam source 13 that emits the energy beam EB is disposed outside the enclosure 2. The beam source 13 is disposed to allow the energy beam EB to be incident inside the enclosure 2 along the incident axis IA. Examples of the energy beam EB include an electron beam or a laser beam. The beam source 13 can be configured to employ any configurations capable of emitting these energy beams EB.

The vacuum chamber 3, the energy beam incident chamber (hereinafter simply referred to as incident chamber) 4, and the radiation emission chamber (hereinafter simply referred to as emission chamber) 5 are spatially connected to each other. In other words, the vacuum chamber 3 and the incident chamber 4 are connected to each other. Similarly, the vacuum chamber 3 and the emission chamber 5 are connected to each other. In the present embodiment, the vacuum chamber 3, the incident chamber 4, and emission chamber 5 are constituted by a chamber body 14, an outer protrusion 15 protruding forward from the front face of the chamber body 14, and two inner protrusions 16 and 17 protruding inward from the inner circumferential face of the chamber section 14. The chamber body 14, the outer protrusion 15, and the two inner protrusions 16 and 17 are made of metal material, for example.

The chamber body 14 is configured such that its external shape is approximately rectangular and has its front, rear, left, and right faces that are arranged to face the front, rear, left and right faces of the enclosure 2, respectively. The chamber body 14 has a right-front corner, which is located between the front face and the right side face, that is disposed to be on the incident axis IA of the energy beam EB.

As shown in FIG. 1, an emission hole 18 is formed in the front face of the chamber body 14. The emission hole 18 is formed along the emission axis EA of the radiation R and in line with the emission hole 8 in the front face of the enclosure 2. The outer protrusion 15 is configured to protrude forward from the circumferential edge of the emission hole 18 in the chamber body 14. The outer protrusion 15 is configured to protrude more forward than the emission hole 8 in the enclosure 2 in the manner of being inscribed in the emission hole 8 in the enclosure 2. The inner protrusion 16 is configured to protrude inward from the circumferential edge of the emission hole 18 inside the chamber body 14. The space surrounded by the outer protrusion 15 and the inner protrusion 16 serves as the emission chamber 5. The outer protrusion 15 and the inner protrusion 16 themselves, which are the components constituting the emission chamber 5, can also be referred to as the emission chamber. The outer protrusion 15 and the inner protrusion 16 may be formed integrally with the chamber body 14, or they may be formed separately and then connected to the chamber body 14.

The emission chamber 5 is configured to have a cone shape with its central axis being aligned with the emission axis EA of the radiation R. The emission chamber 5 is configured to have a large cross-sectional area at its center portion in the direction of the emission axis EA of the radiation R, and have the cross-sectional area being decreased toward its front and rear ends. In other words, the emission chamber 5 is shaped to taper toward the front and rear ends.

An incident window 19 is formed in the right-front corner of the chamber body 14. The incident window 19 is formed along the incident axis IA of the energy beam EB and is in line with the incident hole 9 in the right side face of the enclosure 2. The inner protrusion 17 is configured to protrude inside the right-front corner of the chamber body 14 along the incident axis IA of the energy beam EB from a position surrounding the incident window 19. In the internal space of the chamber body 14, the space surrounded by the inner protrusion 17 serves as the incident chamber 4. The inner protrusion 17 and the right-front corner of the chamber body 14 themselves, which constitute the incident chamber 4, can also be referred to as the incident chamber. The inner protrusion 17 may be formed integrally with the chamber body 14, or it may be formed separately and then connected to the chamber body 14.

The incident chamber 4 is configured to have a cone shape with its central axis being aligned with the incident axis IA of the energy beam EB. The incident chamber 4 is configured to have a cross-sectional area being decreased toward its end inside the chamber body 14 in the direction of the incident axis IA of the energy beam EB. In other words, the incident chamber 4 is shaped to taper toward the end thereinside.

In the internal space of the chamber body 14, the space excluding the internal space of the inner protrusion 16, which serves as the emission chamber 5, and the internal space of the inner protrusion 17, which serves as the incident chamber 4, serves as the vacuum chamber 3. The components themselves constituting the vacuum chamber 3 can also be referred to as the vacuum chamber. As shown in FIG. 1, the chamber body 14 has a portion that protrudes through the through-hole 12 in the left side face of the enclosure 2 to the outside of the enclosure 2, and the portion has a front end connected to an exhaust pump 20. The exhaust pump 20 exhausts the inside of the vacuum chamber 3 and depressurizes the vacuum chamber 3. This suppresses the attenuation of the radiation R generated in the vacuum chamber 3. The inside of the vacuum chamber 3 is not necessarily a vacuum atmosphere, provided that it is a reduced-pressure atmosphere with respect to the incident chamber 4 and the emission chamber 5. The inside of the vacuum chamber 3 may be supplied with an inert gas. The specific configuration of the exhaust pump 20 is not limited, and any pump such as a vacuum pump can be used.

The raw material supply mechanism 6 generates the plasma P in the plasma generation area 21 in the vacuum chamber 3 and emits the radiation R (X-rays, EUV light). The raw material supply mechanism 6 includes a disk-shaped rotation body 50 for supplying raw material, and a container 24 that accommodates the liquid plasma raw material (radiation raw material) 23. As shown in FIG. 1, the disk-shaped rotation body 50 has an incident area 25 in which the energy beam EB is incident. The rotation body 50 is disposed in the vacuum chamber 3 such that the incident area 25 is located at the intersection of the incident axis IA and the emission axis EA. The incident area 25 of the rotation body 50 is supplied with the plasma raw material 23 and is irradiated with the energy beam EB incident therein to generate the plasma P. The area (space) where the plasma P is generated in the vacuum chamber 3 becomes the plasma generation area 21. Accordingly, the plasma generation area 21 is the area corresponding to the position of the incident area 25 of the rotation body 50. The raw material supply mechanism 6 will be described in detail below.

The controller 7 controls the operation of each component provided in the light source apparatus 1. For example, the controller 7 controls the operation of the beam source 13 and the exhaust pump 20. In addition, the controller 7 controls the operation of various motors, plasma raw material circulators, external voltage sources, etc., which will be described later. The controller 7 includes computer hardware circuits necessary for computers, such as CPUs and memories (RAMS, ROMs). CPUs load control programs stored in memories into RAMS and execute them to perform various processes. As the controller 7, programmable logic devices (PLD) such as field programmable gate arrays (FPGA), and other devices such as application specific integrated circuits (ASIC) may be used. In FIG. 1, the controller 7 is schematically illustrated as a functional block; however, the controller 7 may be designed in any desired manner including the position in which the controller 7 is configured. In the present embodiment, CPUs in the controller 7 execute the programs for the present embodiment, which in turn, perform the plasma generation method and the radiation emission method.

Hereinafter, the various chambers constituting the light source apparatus 1 and the raw material supply mechanism 6 will be described in detail.

Incident Chamber

The incident chamber 4 includes the inner protrusion 17 at the right-front corner of the chamber body 14. The incident window 19 is provided in the right-front corner of the chamber body 14. The energy beam EB emitted from the beam source 13 is incident inside the incident chamber 4 through the incident window 19 along the incident axis IA. Note that the incident axis IA of the energy beam EB can also be referred to as the optical axis (principal axis) of the energy beam EB incident inside the incident chamber 4.

The incident window 19 is made of a material that is transmissive to the energy beam EB and is designed to have a thickness that can withstand a pressure difference between the inside and outside of the incident chamber 4. Examples of the incident window 19 include a metal film such as titanium or aluminum when the energy beam EB is an electron beam. The incident window 19 can be made of glass material (quartz glass) when the energy beam EB is a laser beam. The incident window 19 can be made of any other material that is transmissive to the energy beam EB.

The inner protrusion 17 protrudes toward the incident area 25 on a front surface 51*a* of the rotation body 50 and is provided with an incident aperture 26 at the front end of the protrusion. The incident aperture 26 is located in line with the incident window 19 along the incident axis IA of the energy beam EB. The incident aperture 26 allows the energy beam EB to be incident from the incident chamber 4 into the vacuum chamber 3. In other words, the energy beam EB traveling along the incident axis IA through the incident window 19 passes through the incident aperture 26 and is incident into the rotation body 50 located in the vacuum chamber 3.

A capturing mechanism is provided inside the incident chamber 4 to capture the scattered plasma raw material 23 and debris. In the example shown in FIG. 1, the capturing mechanism includes a rotary window 27 that is a plate-shaped rotation member for transmitting the energy beam EB and capturing the plasma raw material 23 and debris. The rotary window 27 is configured, for example, to be disk-shaped. The rotary window 27 is provided with a rotation shaft of a motor, which is not shown in the figure, attached to its center. The motor rotates the rotation shaft, which in turn rotates the rotary window 27. The motor is driven and controlled by the controller 7. The motor is disposed outside the enclosure 2, and the rotation shaft is connected to the rotary window 27 through a through-hole formed in the enclosure 2 and the chamber body 14, which are not shown in the figure. A mechanical seal is used to introduce the rotation shaft into the chamber body 14, allowing the rotary window 27 to rotate while maintaining the atmosphere in the incident chamber 4 (gas atmosphere as will be described below). The rotation shaft that rotates the rotary window 27 is located offset from the incident axis IA of the energy beam EB. This allows the energy beam EB to travel through the beam transmission area of the rotary window 27 without being interfered by the rotation shaft of the rotary window 27. Rotating the rotary window 27 makes it possible to increase the substantial area of the beam transmission area of the rotary window 27, achieving a longer service life of the rotary window 27 and reducing the frequency of replacing the rotary window 27.

As shown in FIG. 1, the chamber body 14 is provided with a gas injection channel 28 that is communicated with the incident chamber 4. Through the gas injection channel 28, gas is supplied to the incident chamber 4 from a gas supply system, which is omitted in the figure. The gas supplied is a gas that has high transmittance to the energy beam EB, for example, a noble gas including argon (Ar) and helium (He). The gas is supplied to increase the pressure inside the incident chamber 4. In other words, supplying the incident chamber 4 with gas through the gas injection channel 28 enables the internal pressure of the incident chamber 4 to maintain a sufficiently higher pressure than the internal pressure of the vacuum chamber 3. The inner protrusion 17 has a cone shape having a smaller cross-sectional area toward the side of the protrusion (the side in which the incident aperture 26 is formed). The incident aperture 26 is provided at the front end of the inner protrusion 17. This configuration is favorable for supplying gas to increase the internal pressure of the incident chamber 4. In addition, the inner protrusion 17 configured in a cone shape contributes to reducing the space occupied by the inner protrusion 17 in the chamber body 14. This allows for more flexibility in designing the arrangement of other components, thereby downsizing the apparatus.

Emission Chamber

The emission chamber 5 has a cone-shape with the emission axis EA as its central axis and is connected to a utilization apparatus such as a mask inspection apparatus at the front end of the emission chamber 5 (front end of the outer protrusion 15). In the example shown in FIG. 1, the emission chamber 5 is connected to an application chamber 30 as a chamber that constitutes part of the utilization apparatus. The pressure inside the application chamber 30 may be atmospheric pressure. The inside of the application chamber 30 may be purged with gas (e.g., inert gas) introduced from a gas injection channel 31 if necessary. The gas inside the application chamber 30 may be exhausted by an exhaust means, which is omitted in the figure.

As shown in FIG. 1, the outer protrusion 15 is provided with a gas injection channel 32 that is communicated with the emission chamber 5. Through the gas injection channel 32, gas is supplied to the emission chamber 5 from a gas supply device, which is omitted in the figure. The gas supplied is a gas that has high transmittance to the radiation R, for example, a noble gas such as argon and helium. Argon and helium can be used as a gas having high transmittance for both the energy beam EB and the radiation R. Hence, the same gas may be supplied to both the incident chamber 4 and the emission chamber 5. This case makes it possible to use a gas supply system in common, thus simplifying the apparatus. Of course, the gas supplied to the incident chamber 4 may be different from the gas supplied to the emission chamber 5. The gas is supplied to increase the pressure inside the emission chamber 5. In other words, supplying the emission chamber 5 with gas through the gas injection channel 32 enables the internal pressure of the emission chamber 5 to maintain a sufficiently higher pressure than the internal pressure of the vacuum chamber 3.

Inside the emission chamber 5, provided is a collector (focusing mirror) 33 that guides and focuses the radiation R that has been incident inside the emission chamber 5 into the utilization apparatus (into the application chamber 30). In FIG. 1, the component of the radiation R that has been incident into the emission chamber 5 and that is focused is illustrated in hatching. The outer surface of the collector 33 is in contact with the inner surface of the emission chamber 5 (inner surface of the outer protrusion 15) for cooling and alignment. The collector 33 may adopt, for example, a single-shell grazing incidence reflector. The body of the collector 33 is made of metal such as aluminum (Al), nickel (Ni), or stainless steel.

The collector 33 is optionally provided with a reflective coating on the inner reflective surface thereof. The reflective coating that reflects the radiation R is suitably made of a material such as ruthenium (Ru). Instead of having a structure in which its body is coated with Ru, which is expensive, the collector 33 may be configured to have the body made of glass (silicon dioxide: $SiO_2$) with its inner surface polished to form a radiation reflecting surface. Although the collector made of glass has a lower reflectivity than the collector made of metal coated with Ru, the material of the collector made of glass is much less expensive than that of the collector coated with Ru, thereby allowing for replacing the collector 33 frequently.

The inner protrusion 16, which constitutes the emission chamber 5, protrudes toward the incident area 25 on the front surface 51_a_ of the rotation body 50 and is provided with an emission aperture 34 at the front end of the protrusion. The emission aperture 34 is located in line with the emission hole 18 in the chamber body 14 and the emission hole 8 in the enclosure 2 along the emission axis EA of the radiation R. The emission aperture 34 allows the radiation R to be incident into the emission chamber 5 from the vacuum chamber 3. In other words, part of the radiation R emitted from the plasma P is incident on the collector 33 through the emission aperture 34. The radiation R that has been incident on the collector 33 is guided and focused by the collector 33 in the application chamber 30. Designing the aperture area of the emission aperture 34 appropriately makes it possible to control the aperture angle of the radiation R incident on the collector 33. Note that the emission axis EA of the radiation R can also be referred to as the optical axis (principal axis) of the radiation R taken into the emission chamber 5 from the plasma P.

The inner protrusion 16 has a cone shape having a smaller cross-sectional area toward the side of the protrusion (the side in which the emission aperture 34 is formed). Hence, the inner protrusion 16 can also be referred to as a collector cone. The emission aperture 34 is provided at the front end of the inner protrusion 16, which has a cone shape. This configuration is favorable for supplying gas to increase the internal pressure of the emission chamber 5. In addition, the inner protrusion 16 configured in a cone shape contributes to reducing the space occupied by the inner protrusion 16 in the chamber body 14. This allows for more flexibility in designing the arrangement of other components, thereby downsizing the apparatus.

As shown in FIG. 1, a filter film 35 is provided between the emission chamber 5 and the application chamber 30. The filter film 35 serves to physically separate (physically separate the space) the plasma generation area 21 in the vacuum chamber 3 from the application chamber 30, preventing the scattered plasma raw material 23 and debris from entering the application chamber 30. The filter film 35 is made of a material that transmits the radiation R generated in the plasma generation area 21. When the radiation R is X-rays, the filter film 35 is constituted by, for example, a beryllium thin film that has a very high transmittance for X-rays. When the radiation R is EUV light, the filter film 35 is made of zirconium (Zr), for example.

Although being supplied with gas, the emission chamber 5 has a reduced-pressure atmosphere thereinside because it is spatially communicated with the vacuum chamber 3. In contrast, the application chamber 30 may have an atmospheric pressure thereinside as described above. In this case, there is a pressure difference between the emission chamber 5 and the application chamber 30. Accordingly, the filter film 35 has a thickness durable enough to withstand this pressure difference. In other words, the filter film 35 is configured to avoid destroying the reduced-pressure atmosphere in the emission chamber 5, which is spatially communicated with the vacuum chamber 3.

A shielding member (central occultation) 36 is disposed inside the emission chamber 5. The shielding member 36 is located in line with the emission hole 18 in the chamber body 14, the emission hole 8 in the enclosure 2, and the filter film 35 along the emission axis EA of the radiation R. Of the radiation R emitted from the plasma P and incident into the emission chamber 5, there can be radiation components that are not focused by the collector 33 and that travel in the emission chamber 5. At least part of these unfocused radiation components spread out while traveling. Typically, such radiation components are unusable with the utilization equipment and often unnecessary. In the present embodiment, the shielding member 36 can block the radiation components that are not focused by the collector 33.

As shown in FIG. 1, in the present embodiment, a gas nozzle 37 is disposed on the rear side of the incident chamber 4, extending in the left-right direction. The gas nozzle 37 is disposed in the right side face of the chamber body 14 using a seal member or the like. The gas nozzle 37 is connected to a gas supply device, which is omitted in the figure, to supply the chamber body 14 with gas. In the example shown in FIG. 1, the gas nozzle 37 ejects gas from the right side of an area between the incident axis IA and the emission axis EA toward the left side thereof in the left-right direction. This allows the debris that has been released from the incident area 25 to move in a direction away from the incident axis IA and the emission axis EA.

Raw Material Supply Mechanism

Figure 2:
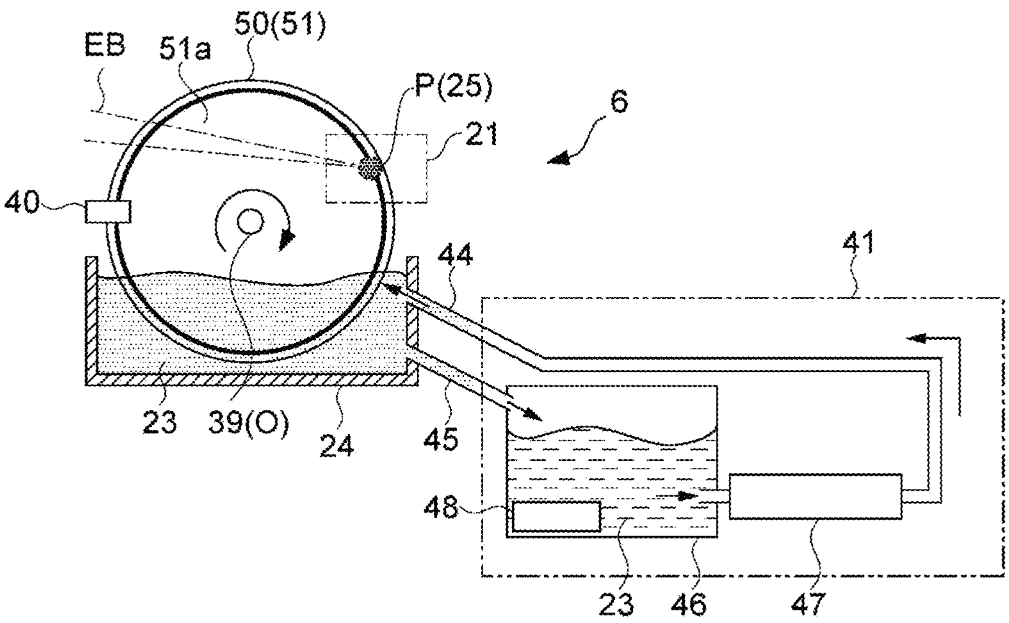
FIG. 2 is a schematic diagram illustrating a configuration example of a raw material supply mechanism.

FIG. 2 is a schematic diagram illustrating a configuration example of the raw material supply mechanism 6. FIG. 2 illustrates the rotation body 50 and the container 24 viewed from the direction of arrow A in FIG. 1. Accordingly, the front surface 51*a* of the rotation body 50 is illustrated in FIG. 2. As shown in FIGS. 1 and 2, the raw material supply mechanism 6 includes the rotation body 50, the container 24, a motor 38, a shaft 39, a skimmer 40, and a plasma raw material circulator 41.

The rotation body 50 is a member that supplies the plasma raw material 23 to the plasma generation area 21 by rotating around a rotation axis O and is disposed at a position at which the energy beam EB is incident. Specifically, the rotation axis O is disposed to intersect with the incident axis IA of the energy beam EB. The rotation body 50 has the front surface 51*a* and a back surface 51*b*, and the incident area 25 onto which the energy beam EB is incident is set at a predetermined position of the front surface 51*a*.

In addition, the rotation body 50 has a groove 55. The groove 55 is a groove-shaped structural portion formed in the rotation body 50 and is disposed to overlap the incident area 25 of the energy beam EB. In the present embodiment, the groove 55 is disposed at a position overlapping the incident area 25 on the front surface 51*a* of the rotation body 50 onto which the energy beam EB is incident. In addition, the groove 55 is formed to be an annular groove around the rotation axis O of the rotation body 50. As shown in FIG. 2, the incident area 25 onto which the energy beam EB is incident is set in the vicinity of the circumferential edge of the front surface 51*a* of the rotation body 50 in the present embodiment. The annular groove 55 is formed in a manner of passing through this incident area 25. Hence, the annular groove 55 will always overlap the incident area 25 while the rotation body 50 rotates.

The rotation body 50 is made of a high-melting point metal such as tungsten (W), molybdenum (Mo), or tantalum (Ta). The lower side of the rotation body 50 is partially immersed in the plasma raw material 23 stored in the container 24. The position of the rotation body 50 and the amount of the plasma raw material 23 stored in the container 24 are set such that at least a part of the groove 55 is immersed in the plasma raw material 23.

When X-rays are emitted as the radiation R, X-ray raw materials are used as the plasma raw material 23. The X-ray raw material is a metal that is in the form of liquid at room temperature. Examples of the X-ray raw material include gallium (Ga), and gallium alloys such as Galinstan (registered trademark), which is a eutectic alloy of gallium, indium (In), and tin (Sn). When EUV light is emitted as the radiation R, EUV raw materials are used as the plasma raw material 23. Examples of the raw material that emits EUV light include tin (Sn) and lithium (Li) that are in the form of liquid. Since Sn and Li are solid at room temperature, the container 24 is provided with a temperature control means, which is omitted in the figure. When the EUV raw material is Sn, for example, the container 24 is maintained at a temperature above the melting point of Sn.

The shaft 39 of the motor 38 is connected to the center of the back surface 51*b* of the rotation body 50. The controller 7 controls the operation of the motor 38, which allows the rotation body 50 to rotate via the shaft 39. The shaft 39 is a pillar-shaped member extending in a direction orthogonal to the front surface 51*a* of the rotation body 50. The central axis of the shaft 39 is the rotation axis O of the rotation body 50 and the motor 38. The shaft 39 passes through the through-hole 10 in the enclosure 2 and is introduced into the vacuum chamber 3 via a mechanical seal 42. The mechanical seal 42 allows the shaft 39 to rotate while maintaining a reduced-pressure atmosphere in the vacuum chamber 3.

As described above, the rotation body 50 is disposed such that the annular groove 55 is immersed in the plasma raw material 23 stored in the container 24. In this state, when the rotation body 50 rotates around the shaft 39, the plasma raw material 23 that has spread on the groove 55*a* of the front surface 51*a* and the surroundings is pulled up from the container 24. This method allows the plasma raw material 23 to be applied over the entire circumference of the annular groove 55. The plasma raw material 23 that has been applied to the groove 55 is transported to the incident area 25 of the energy beam EB with the rotation of the rotation body 50. Accordingly, in the present embodiment, the container 24, the motor 38, and the shaft 39 allow the plasma raw material 23 to be supplied to the groove 55 of the rotation body 50. In the present embodiment, the container 24, the motor 38, and the shaft 39 constitute a raw material supply section.

The skimmer 40 is a member that adjusts the layer thickness of the plasma raw material 23 that has been applied on the rotation body 50. The skimmer 40 is fixed at a position directly above the groove 55, and independently of the rotation body 50. The skimmer 40 serves to skim off part of the plasma raw material 23 rotating with the rotation body 50. The skimmer 40 is fixed, for example, with a retainer (not shown) provided separately from the rotation body 50, such that the skimmer is in close proximity or contact with the groove 55 provided on the surface 51*a* of the rotation body 50. In this state, when the rotation body 50 rotates, the plasma raw material 23 blocked by the skimmer 40 is removed from the front surface of the rotation body 50. Note that the structure and position of the skimmer 40 are set such that the plasma raw material 23 remains on the front surface 51*a* of the rotation body 50. Accordingly, the skimmer 40 functions as a scraper to partially skim off the plasma raw material 23 on the rotation body 50.

In the example shown in FIG. 1, the skimmer 40 is a member having a channel structure that sandwiches the outer edge of the rotation body 50. In this case, the skimmer 40 has a structure with a U-shaped cross section. The skimmer 40 is disposed with a predetermined gap from the front surface 51*a* of the rotation body 50 such that the skimmer 40 sandwiches the rotation body 50 inside the skimmer 40. This configuration makes it possible to adjust, of the front surface 51*a* (groove 55) of the rotation body 50, the layer thickness of the plasma raw material 23 in the incident area 25. The skimmer 40 may have a fixed position or a variable positon with respect to the rotation body 50. The structure of the skimmer 40 is not limited to the channel structure; the skimmer 40 can also have other structures.

The plasma raw material 23 on the groove 55, the layer thickness of which has been adjusted by the skimmer 40, is transported to the incident area 25, onto which the energy beam EB is incident, with the rotation of the rotation body 50. In other words, the direction of rotation of the rotation body 50 is a direction in which the plasma raw material 23 on the groove 55 passed through the skimmer 40 is transported to the incident area 25. In the incident area 25, the plasma raw material 23 on the groove 55 is irradiated with the energy beam EB to generate the plasma P. The operation of the rotation body 50 and the skimmer 40 will be described in detail.

The plasma raw material circulator 41 appropriately replenishes the container 24 with the plasma raw material 23 when the plasma raw material 23 is consumed due to the operation of generating the radiation R. The plasma raw material circulator 41 also serves as a temperature adjustment mechanism (cooling mechanism) for the plasma raw material 23.

As shown in FIG. 2, the plasma raw material circulator 41 includes a raw material inlet pipe 44, a raw material outlet pipe 45, a raw material storage tank 46, a raw material drive section (pump) 47, and a temperature adjustment mechanism 48. The raw material storage tank 46 stores the plasma raw material 23. The raw material inlet pipe 44 and the raw material outlet pipe 45 are disposed between the raw material storage tank 46 and the container 24 to communicate the raw material storage tank 46 with the container 24. The raw material drive section 47 is disposed in the raw material inlet pipe 44. Driving the raw material drive section 47 allows the plasma raw material 23 that has been stored in the raw material storage tank 46 to flow into the raw material inlet pipe 44, circulating the plasma raw material 23 in the circulation system including the raw material storage tank 46, the raw material inlet pipe 44, the container 24, and the raw material outlet pipe 45. Examples of the raw material drive section 47 include an electromagnetic pump capable of transporting liquid metal (plasma raw material 23) using magnetic force; however, other types of pumps may also be used.

In the present embodiment, the raw material storage tank 46 and the raw material drive section 47 are disposed outside the vacuum chamber 3 and also outside the enclosure 2. The raw material inlet pipe 44 and the raw material outlet pipe 45, which extend from the plasma raw material circulator 41 to the container 24, pass through the through-hole 11 in the enclosure 2, are introduced into the vacuum chamber 3 via a seal member 49, and are connected to the container 24. The seal member 49 allows the raw material inlet pipe 44 and the raw material outlet pipe 45 to penetrate from the outside to the inside of the vacuum chamber 3 while maintaining a reduced-pressure atmosphere in the vacuum chamber 3.

Of the plasma raw material 23 that has been applied onto the front surface 51*a* (groove 55) of the rotation body 50, the part thereof is consumed when irradiated with the energy beam EB. Hence, in order for the stable operation of generating the radiation R (X-ray or EUV light) for a long period of time, a large volume of the plasma raw material 23 needs to be stored in the container 24. Meanwhile, when the size of the vacuum chamber 3 in the light source apparatus 1 is taken into consideration, the container 24 that can be accommodated inside the vacuum chamber 3 has a limitation on its size, thus the container 24 often has difficulty in storing a large volume of the plasma raw material 23. Hence, the raw material storage tank 46 capable of storing a large volume of the plasma raw material 23 is disposed outside the vacuum chamber 3, and is configured to replenish the raw material storage portion of the container 24 with the plasma raw material 23 via the raw material inlet pipe 44. This configuration allows the amount of the plasma raw material 23 in the raw material storage portion of the container 24 to be maintained at a constant level over a long period of time, thus enabling the stable operation of generating the radiation R over a long period of time. In other words, the plasma raw material circulator 41 circulates the plasma raw material 23 between the raw material storage portion of the container 24 and the raw material storage tank 46 such that the amount of the plasma raw material 23 in the raw material storage portion of the container 24 is maintained at a constant level.

When the plasma raw material 23 that has been applied onto the front surface 51*a* (groove 55) of the rotation body 50 is irradiated with the energy beam EB, the radiation R is generated from the plasma raw material 23 (target), and at the same time, the rotation body 50 itself is heated. Every time this heated rotation body 50 passes through the raw material storage portion of the container 24 in which the plasma raw material 23 is stored, the heat in the heated rotation body 50 is transferred to the plasma raw material 23 in the container 24. Hence, the temperature of the plasma raw material 23 in the container 24 gradually varies. When the viscosity of the plasma raw material 23 varies with temperature, the temperature variations of the plasma raw material 23 cause variations in the wettability of the rotation body 50 with respect to the plasma raw material 23, thereby varying the state of adhesion of the plasma raw material 23 to the rotation body 50. As a result, the output of the radiation R may also vary.

The plasma raw material circulator 41 according to the present embodiment includes the raw material storage tank 46 that has a relatively large capacity outside the vacuum chamber 3 (outside the enclosure 2). Hence, even if the plasma raw material 23 that has varied its temperature in the raw material storage portion of the container 24 flows into the raw material storage tank 46 via the raw material outlet pipe 45, the temperature of the plasma raw material 23 in the raw material storage tank 46 does not vary much and remains nearly constant. The plasma raw material 23, the temperature of which is maintained nearly constant, flows into the container 24 via the raw material inlet pipe 44. In this way, circulating the plasma raw material 23 through the plasma raw material circulator 41 enables the temperature of the plasma raw material 23 in the container 24 to be maintained at a nearly constant level. Therefore, this configuration is also capable of stabilizing the state of adhesion of the plasma raw material 23 to the rotation body 50, stabilizing the output of the radiation R.

In addition, the temperature of the plasma raw material 23 in the raw material storage tank 46 may be adjusted by the temperature adjustment mechanism 48 that is provided inside the raw material storage tank 46. Since the raw material storage tank 46 is disposed outside the vacuum chamber 3 (outside the enclosure 2), the temperature adjustment mechanism 48 can have a large capacity, which is unaffected by the size of the vacuum chamber 3. This makes it possible to reliably adjust the temperature of the plasma raw material 23 to a predetermined temperature in a short time.

In this way, the use of the plasma raw material circulator 41 including the temperature adjustment mechanism 48 makes it possible to supply the raw material storage portion of the container 24 with the plasma raw material 23 while maintaining the temperature of the plasma raw material 23 at a constant level. For example, in the case that a liquid metal whose temperature in its liquid state becomes higher than a normal temperature is used as the plasma raw material 23, this configuration also makes it possible to supply the container 24 with the plasma raw material 23 in the liquid phase while maintaining the temperature thereof lower than the normal temperature. Alternatively, in the case that a liquid metal whose temperature in its liquid state becomes lower than a normal temperature is used as the plasma raw material 23, this configuration also makes it possible to supply the container 24 with the plasma raw material 23 in the liquid state while maintaining the temperature thereof higher than the normal temperature.

Figure 3:
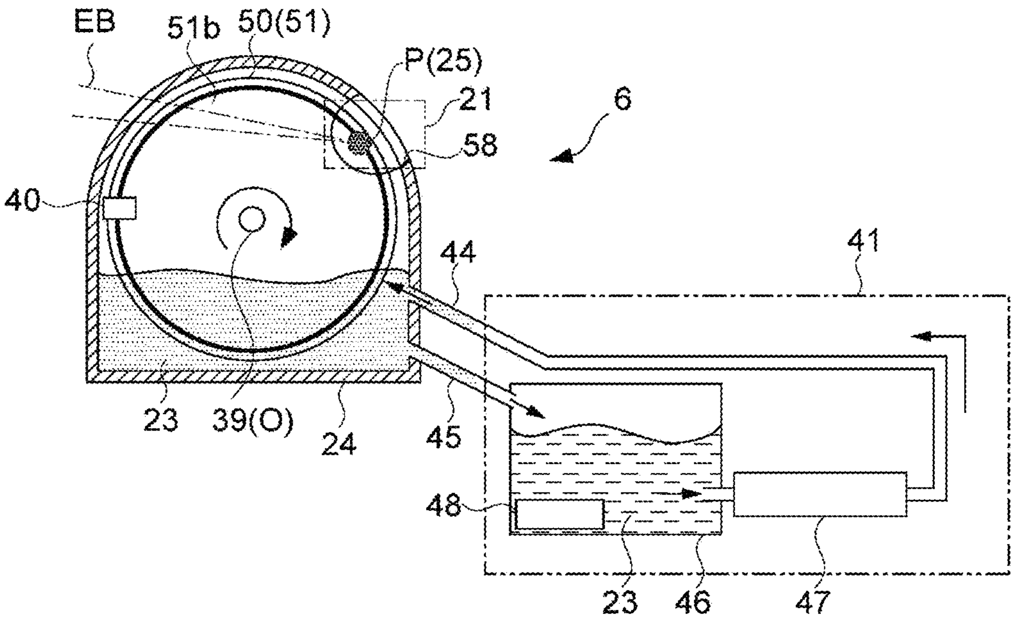
FIG. 3 is a schematic diagram illustrating another configuration example of a container applicable to the light source apparatus.

FIG. 3 is a schematic diagram illustrating another configuration example of a container applicable to the light source apparatus 1. In the example shown in FIG. 3, the container 24 is configured as a cover structure, which can enclose nearly the entire rotation body 50. In other words, the container 24 can serve as a case that accommodates the rotation body 50. As shown in FIG. 3, an opening 58 is formed in the container 24 at a position corresponding to the incident area 25 set on the front surface 51*a* of the rotation body 50. The energy beam EB is incident onto the incident area 25 through the opening 58 to generate the plasma P. In addition, the radiation R is extracted from the plasma P through the opening 58 and is emitted through the emission chamber 5. In this way, the container 24 has the opening through which the energy beam EB and the radiation R pass, and accommodates the rotation body 50. In the present embodiment, container 24 corresponds to a case.

Configuring the container 24 as a cover structure allows the plasma raw material 23 scattered from the rotation body 50 to adhere to the inner walls of the container 24, except for the opening 58 of the container 24. The plasma raw material 23 that has adhered to the inner walls moves to the raw material storage portion at the bottom of the container 24. Hence, the plasma raw material 23 hardly disperses into the space inside the vacuum chamber 3, which is the space outside the container 24. This makes it possible to sufficiently prevent the scattered plasma raw material 23 from adhering to the inner walls of the vacuum chamber 3.

As shown in FIG. 1, in the present embodiment, a radiation diagnosis section 29 is provided in the front side of the chamber body 14, and at the area spatially communicated with the vacuum chamber 3. The radiation diagnosis section 29 is disposed at a position onto which the radiation R emitted in a direction different from the emission axis EA is incident. The radiation diagnosis section 29 measures the physical state of the radiation R and includes a detector that detects the presence or absence of radiation R and a measurement device that measures the output of radiation R, for example.

In addition, as shown in FIG. 1, an external voltage source 59 may be provided to be able to apply a positive high voltage or a negative high voltage to the inner protrusion 16. Applying a voltage to the inner protrusion 16 generates the electric field, which in turn can repel ionic debris from the inner protrusion 16 and divert the traveling direction of the debris away from the direction of entering the emission chamber 5. In this case, the inner protrusion 16 is electrically insulated from the other components including the vacuum chamber 3 by an insulator (not shown) made of ceramic material or the like. In addition, the operation of the external voltage source 59 is controlled by the controller 7.

Process of Generating the Radiation R

Raw Material Supply

The rotation body 50 rotates around the shaft 39 with the state in which the lower part of the rotation body 50 where the groove 55 is provided is immersed in the plasma raw material 23 stored in the container 24. The plasma raw material 23 is pulled up from the raw material storage portion of the container 24 in a manner that it spreads over the front surface 51*a* of the rotation body 50 due to its wettability with the surface 51*a* of the rotation body 50. At this time, the plasma raw material 23 is applied to the groove 55 provided on the surface 51*a*. The plasma raw material 23 is then transported to the incident area 25 where the energy beam EB is incident, with the plasma raw material 23 applied on the groove 55. As shown in FIGS. 2 and 3, the direction of rotation of the rotation body 50 is a direction in which the plasma raw material 23 adhering to the rotation body 50 is pulled up from the raw material storage portion of the container 24, and then passes through the skimmer 40 to reach the plasma generation area 21 (incident area 25).

Plasma Generation

The plasma raw material 23, which has passed the skimmer 40 and the layer thickness of which on the rotation body 50 has been adjusted, reaches the incident area 25. Then the energy beam EB is emitted from the beam source 13 along the incident axis IA toward the incident area 25. The energy beam EB passes through the incident hole 9, the incident window 19, the rotary window 27, and the incident aperture 26, and is incident onto the incident area 25 having the groove 55 on which the plasma raw material 23 has been supplied. When the energy beam EB is incident onto the incident area 25, the plasma raw material 2 present in the groove 55 is vaporized by the energy beam EB. The vaporized plasma raw material 23 is continuously heated and excited by the energy beam EB to generate a high-temperature plasma P. The high-temperature plasma P generated in the plasma generation area 21 emits the radiation R having a predetermined wavelength.

Extraction of the Radiation R

The radiation R emitted from the high-temperature plasma P travels in various directions. Of the radiation, the radiation R incident into the emission chamber 5 passes through the emission chamber 5, and is guided to the utilization apparatus (application chamber 30) such as a mask inspection apparatus. In other words, of the radiation R emitted from the high-temperature plasma P, the component that is incident into the emission chamber 5 is extracted to the outside along the emission axis EA.

Configuration of Rotation Body

Figure 4A:
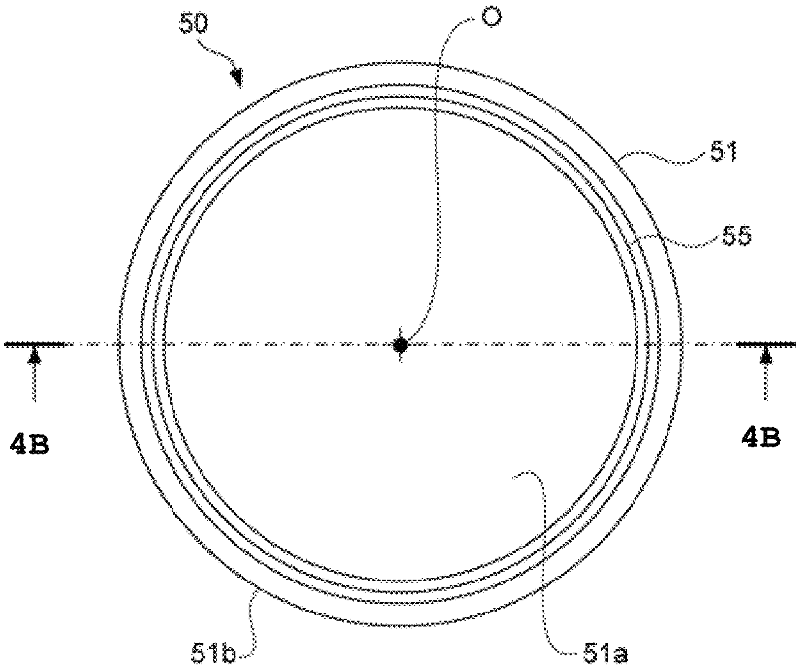
FIG. 4A is a schematic diagram illustrating a configuration example of a rotation body.
Figure 4B:
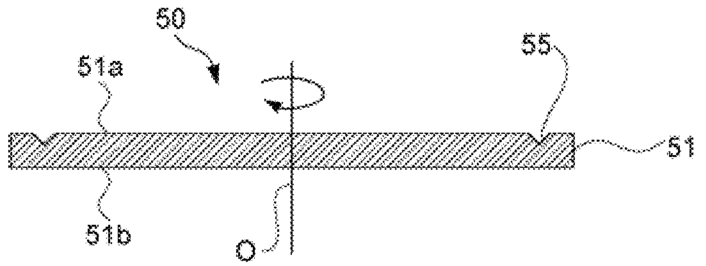
FIG. 4B is a schematic cross-sectional view taken along the line 4B-4B in FIG. 4A.

FIGS. 4A and 4B are schematic diagrams illustrating a configuration example of the rotation body 50. Specifically, FIG. 4A is a plan view of the rotation body 50 when the front surface 51*a* thereof on which the energy beam EB is incident is viewed from the direction of the rotation axis O. FIG. 4B is a cross-sectional view of the rotation body 50 taken along the line 4B-4B in FIG. 4A.

First, the arrangement of the groove 55 will be described. As described above, the rotation body 50 is provided with the groove 55 that overlaps with the incident area 25 of the energy beam EB. Typically, the groove 55 is provided at a position facing the rotation axis O of the rotation body 50. Here, the position facing the rotation axis O refers to a position in the rotation body 50 from which the rotation axis O is in sight. Hence, the groove 55 is formed on a face in the rotation body 50 from which the rotation axis O is in sight.

For example, in the rotation body 50 of a flat plate type, the main surface of the rotation body 50 that intersects the rotation axis O is a face from which the rotation axis O is in sight. Alternatively, when a rotation body 50 having an annular structure centered on the rotation axis O is used (see FIGS. 13 and 14, etc.), the inner circumferential face of the annular structure facing toward the rotation axis O is a face from which the rotation axis O is in sight. Note that the face on which the groove 55 is formed need not be a face from which the rotation axis O is directly in sight; it needs only to be a face that faces toward the rotation axis O, even if there is a shield between it and the rotation axis, for example. On the other hand, the end face connecting the two main surfaces in the rotation body 50 of a flat-plate type is a face from which the rotation axis O is out of sight. In addition, the outer circumferential face of the rotation body 50 having an annular structure, which faces the opposite (outer side) of the rotation axis O, is a face from which the rotation axis O is out of sight.

When the rotation body 50 rotates, a centrifugal force in response to the rotation of the rotation body 50 acts on the plasma raw material 23 on the rotation body 50. The centrifugal force causes the plasma raw material 23 on the rotation body 50 to attempt to move toward a direction away from the rotation axis O. For example, on the face from which the rotation axis O is in sight, the plasma raw material 23 spreads along the face, thus the layer thickness of the plasma raw material 23 will be the one in response to the centrifugal force. Hence, on the face from which the rotation axis O is in sight, a desired layer thickness can be readily achieved depending on the strength of the centrifugal force (rotation speed of the rotation body 50). In contrast, on the face from which the rotation axis O is out of sight, the plasma raw material 23 may aggregate and increase its layer thickness as the centrifugal force increases. The plasma raw material 23 may detach from the rotation body 50 and scatter to the outside as the centrifugal force further increases. Hence, on the face from which the rotation axis O is out of sight, the layer thickness may not be stable.

Accordingly, providing the groove 55 at a position facing the rotation axis O enables the layer thickness of the plasma raw material 23 that has been supplied to the groove 55 to be precisely adjusted using the centrifugal force acting on the plasma raw material 23. Hence, the layer thickness can be readily adjusted by, for example, controlling the rotation speed of the motor 38 that rotates the rotation body 50. It is also possible to stably maintain the layer thickness of the plasma raw material 23 in the groove 55 by keeping the rotation speed of the motor 38 constant.

The rotation body 50 shown in FIGS. 4A and 4B includes a rotation main body 51. The rotation main body 51 is an integral component that serves as the main body of the rotation body 50. For example, a disk integrally formed of metal material is used as the rotation main body 51. Of the two main surfaces of the rotation main body 51, one main surface is the front surface 51*a* on which the energy beam EB is incident, and the other main surface is the back surface 51*b*. The rotation main body 51 (rotation body 50) is made of a high-melting-point metal such as tungsten (W), molybdenum (Mo), or tantalum (Ta).

The rotation main body 51 shown in FIGS. 4A and 4B is a flat plate-shaped member, and each of the front surface 51*a* and the back surface 51*b* thereof is a planar surface orthogonal to the rotation axis O. The front surface 51*a* and the back surface 51*b* are not limited to this embodiment; each of them may be configured to be a convex surface with a protruding center or a concave surface with a recessed center. The front surface 51*a* and the back surface 51*b* may also be configured to be any rotational curved surfaces. In addition, the rotation body 50 can also be constituted by using multiple members. In this case, the rotation body 50 may be configured by attaching other members to the rotation main body 51 (see FIGS. 11A, 11B, and 12), for example.

The groove 55 is provided on the front surface 51*a*, which is one main surface of the rotation main body 51. As described above, the front surface 51*a* of the rotation main body 51 is the surface from which the rotation axis O is in sight. Hence, providing the groove 55 on the front surface 51*a* makes it possible to precisely adjust the layer thickness of the plasma raw material that has been supplied to the groove 55.

The groove 55 is an annular groove formed on the front surface 51*a* of the rotation main body 51 with a predetermined width, and is arranged substantially in a coaxial manner around the rotation axis O. The radius of groove 55 is set to allow the groove 55 to overlap with the incident area 25. Here, the radius of groove 55 is the distance from the center point of the front surface 51*a* of the rotation main body 51 to the center position of the width of the groove 55, for example. The width of the groove 55 is set larger than the beam diameter (spot diameter) of the energy beam incident on the incident area 25. Note that the width of the groove 55 is the width of the groove 55 in the radial direction of the rotation main body 51; it is the distance between the inner edge and the outer edge thereof. As shown in FIG. 4A, the groove 55 (incident area 25) is located on the outside of the front surface 51*a* of the rotation main body 51. For example, the radius of the groove 55 is set to be half the radius of the rotation main body 51 or larger. Arranging the groove 55 (incident area 25) outside the front surface 51*a* enlarge the area that is irradiated with the energy beam EB per rotation. This can suppress, for example, the rise in temperature and damage to the rotation main body 51 caused by the irradiation of the energy beam EB.

In the examples shown in FIGS. 4A and 4B, the cross-sectional shape of the groove 55 along the radial direction of the rotation main body 51 is a wedge shape (a triangular shape). In other words, the groove 55 has a structure in which the front surface 51*a* is cut diagonally from the inside and outside of the rotation main body 51 in the radial direction to the deepest portion. The cross-sectional shape of groove 55 is not limited to a wedge shape; however, it may be, for example, a square shape, a hemispherical shape, or a semi-elliptical shape. The shape of groove 55 will be described below with reference to FIGS. 7 and 8, for example.

Adjustment of layer thickness of plasma raw material

Figure 5A:
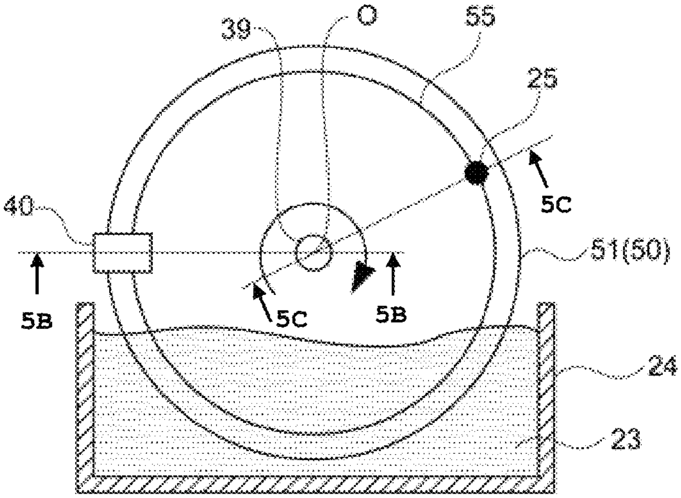
FIG. 5A is a schematic plan view of the rotation body, for describing the distribution of plasma raw material supplied to the rotation body.
Figure 5B:
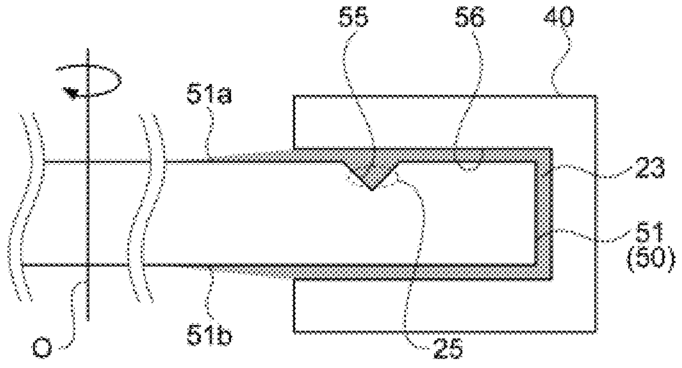
FIG. 5B is a schematic cross-sectional view of the rotation body taken along the line 5B-5B in FIG. 5A, for describing the distribution of plasma raw material supplied to the rotation body.
Figure 5C:
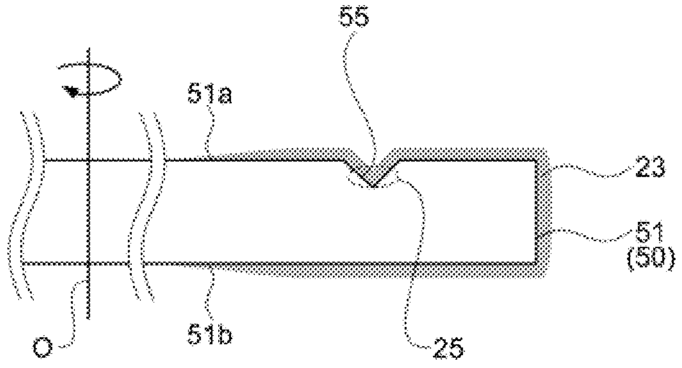
FIG. 5C is a schematic cross-sectional view of the rotation body taken along the line 5C-5C in FIG. 5A, for describing the distribution of plasma raw material supplied to the rotation body.

FIGS. 5A to 5C are schematic diagrams for describing the distribution of the plasma raw material 23 supplied to the rotation body 50. FIG. 5A is a schematic view of the rotation body 50 immersed in the container 24, viewed from the front surface 51*a* thereof. Here, the illustration of the plasma raw material circulator 41 and other devices is omitted. FIGS. 5B and 5C are cross-sectional views of the rotation body 50 taken along the line 5B-5B and the line 5C-5C shown in FIG. 5A, respectively. The line 5B-5B is a line passing through the center of the rotation body 50 and the skimmer 40, and the line 5C-5C is a line passing through the center of the rotation body 50 and the incident area 25 of the energy beam EB. Hereinafter, the adjustment of the layer thickness of the plasma raw material 23 will be described with reference to FIGS. 5A to 5C.

The light source apparatus 1 is provided with a layer thickness adjustment section that adjusts the layer thickness of the plasma raw material 23 in a manner that the front surface of the plasma raw material 23 in the incident area 25 of the energy beam EB forms a concave surface in response to the groove 55. The layer thickness adjustment section is a mechanism for adjusting the layer thickness of the plasma raw material 23 in the incident area 25. The method of adjusting the layer thickness is not limiting; any mechanism capable of adjusting the layer thickness may be used as the layer thickness adjustment section. The light source apparatus 1 is accordingly provided with at least one mechanism capable of adjusting the layer thickness of the plasma raw material 23.

Layer Thickness Adjustment by Skimmer

In the present embodiment, the skimmer 40 described above serves as the layer thickness adjustment section. As shown in FIG. 5A, the groove 55 on which the plasma raw material 23 has been supplied after being pulled up from the container 24, passes through the skimmer 40 before reaching the incident area 25. At this time, the skimmer 40 skims off the excessive plasma raw material 23.

FIG. 5B schematically illustrates the manner in which the plasma raw material 23 is skimmed off by the skimmer 40 of a channel type. The skimmer 40 is provided with a gap in which the rotation body 50 is sandwiched. Of the inner surface of this gap, the surface facing toward the front surface 51*a* (groove 55) of the rotation body 50, becomes an adjustment surface 56 for adjusting the layer thickness of the plasma raw material 23. The adjustment surface 56 is typically positioned parallel to the front surface 51*a* of the rotation body 50. Appropriately adjusting the spacing between the adjustment surface 56 of the skimmer 40 and the front surface 51*a* of the rotation body 50 can adjust the layer thickness of the plasma raw material 23 that is to be transported to the incident area 25.

After the layer thickness is adjusted by the adjustment surface 56 of the skimmer 40, the centrifugal force continues to act on the liquid raw plasma material 23. Then, the plasma raw material 23 is stretched toward the outside of the front surface 51*a*, for example, and is distributed along the groove 55. As a result, as shown in FIG. 5C, the front surface of the plasma raw material 23 forms a concave surface along the shape of groove 55 in the incident area 25 of the energy beam EB.

When the plasma raw material 23 reaches the incident area 25, if the layer thickness thereof is too thick, for example, the front surface of the plasma raw material 23 may not form a concave surface along the shape of the groove 55. Hence, it can be said that the skimmer 40 is a mechanism that removes the excessive plasma raw material 23 and adjusts the layer thickness of the plasma raw material 23 near the groove 55 in advance in a manner that the front surface of the plasma raw material 23 forms a concave surface along the shape of the groove 55 when the plasma raw material 23 reaches the incident area 25.

In addition, the use of the skimmer 40, for example, can supply the incident area 25 with the plasma raw material 23 having a nearly uniform layer thickness. In other words, the use of the skimmer 40 can stabilize the layer thickness of the plasma raw material 23 in the groove 55. Stabilizing the layer thickness of the plasma raw material 23 in the incident area 25 can stabilize the radiation intensity of the radiation R emitted from the plasma P.

Layer Thickness Adjustment with Controller

In the present embodiment, the controller 7 shown in FIG. 1 controls the motor 38 that rotates the rotation body 50. This controller 7 may be used to adjust the layer thickness of the plasma raw material 23 on the rotation body 50. In this case, the controller 7 serves as the layer thickness adjustment section. In the present embodiment, the motor 38 corresponds to the drive section that rotates the rotation body, and the controller 7 corresponds to the rotation controller that controls the drive section.

The centrifugal force in response to the rotation of the rotation body 50 acts on the plasma raw material 23 on the rotation body 50. Hence, the faster the rotation speed of the rotation body 50 is, the stronger the centrifugal force is exerted, thus the layer thickness of the plasma raw material 23 will become thinner on the front surface 51*a* (back surface 51*b*) of the rotation body 50. The controller 7 controls the rotation speed of the rotation body 50 (motor 38) such that the front surface of the plasma raw material 23 forms a concave surface along the shape of the groove 55 in the incident area 25 of the energy beam EB.

In the case in which, for example, the adjustment surface 56 of the skimmer 40 fails to be made sufficiently close to the front surface 51*a* of the rotation body 50, the layer thickness of the plasma raw material 23 may not be sufficiently thin. In such a case, the layer thickness of the plasma raw material 23 can be made thinner by increasing the rotation speed of the rotation body 50. This allows the layer thickness of the plasma raw material 23 to be sufficiently thin by the time it reaches the incident area 25; hence the front surface of the plasma material 23 in the incident area 25 forms a concave surface along the shape of the groove 55.

Moreover, controlling the rotation speed of the rotation body 50 using the controller 7 enables the adjustment of the layer thickness of the plasma raw material 23 precisely and easily. This makes it possible to maintain the layer thickness of the plasma raw material 23 appropriately even if, for example, the skimmer 40 is misaligned or the viscosity of the plasma raw material 23 varies.

Layer Thickness Adjustment by Other Methods

Any method other than the skimmer 40 and the controller 7 can be used for adjusting the layer thickness of the plasma raw material 23. As described above, the plasma raw material circulator 41 connected to the container 24 is provided with the temperature adjustment mechanism 48 that adjusts the temperature of the plasma raw material 23. This temperature adjustment mechanism 48 may be used to adjust the layer thickness of the plasma raw material 23 on the rotation body 50. In this case, the temperature adjustment mechanism 48 serves as a layer thickness adjustment section.

For example, when the temperature of the plasma raw material 23 varies, the viscosity of the plasma raw material 23 varies. Typically, the higher the temperature of the plasma raw material 23, the lower its viscosity. Hence, when the rotation body 50 rotates at a constant rotational speed, for example, the higher the temperature of the plasma raw material 23 on the rotation body 50, in other words, the lower the viscosity of the plasma raw material 23, the more easily the plasma raw material 23 spreads along the front surface 51*a*, thereby becoming the layer of plasma raw material 23 thinner. The temperature adjustment mechanism 48 controls the temperature of the plasma raw material 23 such that the front surface of the plasma raw material 23 forms a concave surface along the shape of the groove 55 in the incident area 25 of the energy beam EB. In this way, the temperature control over the plasma raw material 23 may control the layer thickness thereof.

In the light source apparatus 1, at least one of the following layer thickness adjustment methods is performed: the layer thickness adjustment using the skimmer 40, the layer thickness adjustment controlling the rotation speed by the controller 7, and the layer thickness adjustment using the temperature control by the temperature adjustment mechanism 48. In addition, the layer thickness adjustment using any combination of these methods may be performed.

Distribution of High-Temperature Plasma

Figure 6A:
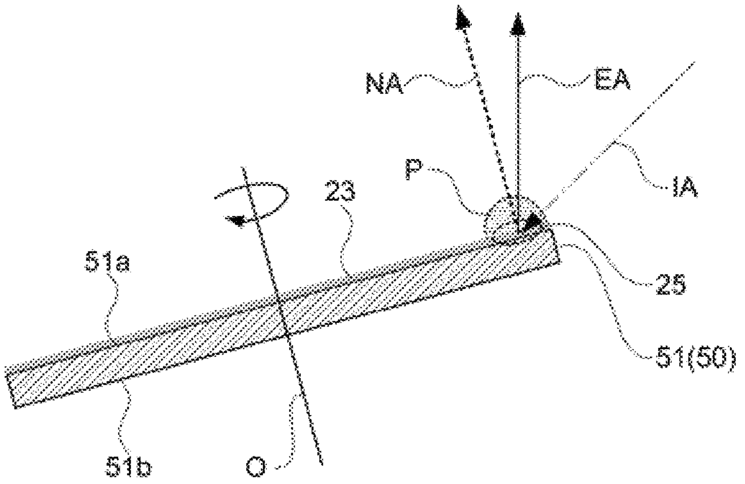
FIG. 6A is a schematic cross-sectional view of the rotation body, for describing the distribution of high-temperature plasma.
Figure 6B:
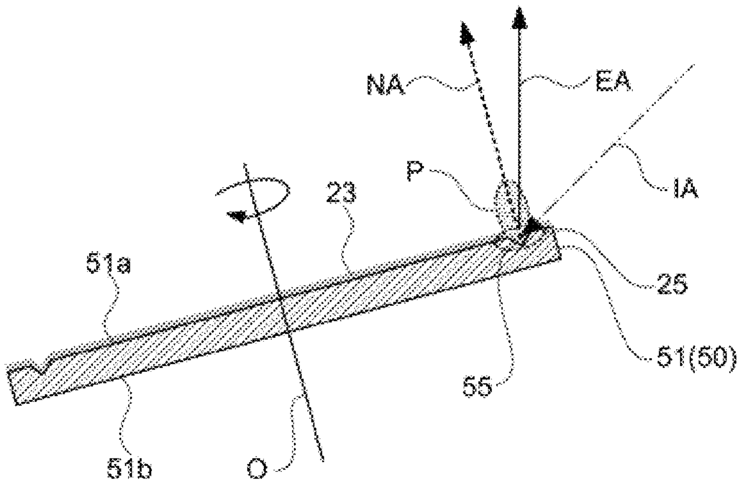
FIG. 6B is a schematic cross-sectional view of the rotation body, for describing the distribution of high-temperature plasma.

FIGS. 6A and 6B are schematic diagrams that describe the distribution of the high-temperature plasma P. FIG. 6A schematically illustrates the state of the formation of the high-temperature plasma P in the case of no groove 55 on the front surface 51*a* of the rotation body 50. FIG. 6B schematically illustrates the state of the formation of the high-temperature plasma P in the case of the groove 55 on the front surface 51*a* of the rotation body 50. In each figure, the surface 51*a* of the rotation body 50 is coated with the liquid plasma raw material 23. In addition, FIGS. 6A and 6B schematically illustrate the incident axis IA of the energy beam EB, the normal axis NA to the front surface 51*a* of the rotation body 50, and the emission axis EA of the radiation R using a two-dot chain line arrow, a dashed line arrow, and a solid line arrow, respectively.

As shown in FIG. 6A, in the case of no groove 55 on the front surface 51*a* of the rotation body 50, the plasma raw material 23 is distributed in a planar manner over the surface 51*a* of the rotation body 50 in the incident area 25 of the energy beam EB. When irradiated with the energy beam EB, the liquid plasma raw material 23 present in the incident area 25 immediately vaporizes and expands along the front surface of the plasma raw material 23, which is distributed in a planar manner. This vaporized and expanded plasma raw material 23 (vaporized raw material) is continuously irradiated with the energy beam EB, thus the vaporized raw material is heated and excited to transform into plasma. This leads to eventually generating the high-temperature plasma P that spreads isotropically around the point at which the energy beam EB is incident.

In FIG. 6A, vaporization expansion occurs along the front surface of the plasma raw material 23, which is distributed in a planar manner. Hence, the vaporized raw material spreads isotropically over a wide area without being blocked by the front surface of the plasma raw material 23, for example. This often causes the density of the vaporized raw material that is heated and excited by the energy beam EB to be lower, possibly making it difficult to efficiently generate the high-temperature plasma P.

In contrast, in FIG. 6B, the groove 55 is provided on the front surface 51*a* of the rotation body 50. Furthermore, the layer thickness of the plasma raw material 23 is controlled by using the layer thickness adjustment section including the skimmer 40 as described above. Hence, in the incident area 25 of the energy beam EB, the front surface of the plasma raw material 23 forms a concave surface in response to the groove 55. When the energy beam EB radiates toward the groove 55 (incident area 25), as is similar to the case of FIG. 6A, the liquid plasma raw material 23 that has been supplied to the groove 55 immediately vaporizes and expands along the front surface of the plasma raw material 23, which forms a concave surface in response to the groove 55. In this way, the plasma raw material 23 (vaporized raw material) that has vaporized and expanded along the concave surface in response to the groove 55 is continuously irradiated with the energy beam EB, thus the vaporized raw material is heated and excited to generate the high-temperature plasma P.

As described above, the vaporized raw material generated by the irradiation of the energy beam EB expands along the front surface of the plasma raw material 23. In other words, the vaporized raw material has its expansion direction regulated along the shape of the front surface of the plasma raw material 23. As shown in FIG. 6B, in the rotation body 50 according to the present invention, the front surface of the plasma raw material 23 in the incident area 25 forms a concave surface in response to the groove 55. This concave surface regulates the direction of expansion of the vaporized plasma raw material 23 (vaporized raw material). In FIG. 6B, for example, the front surface of the plasma raw material 23 in the incident area 25 forms a recessed shape along the wedge-shaped groove 55. This regulates the expansion of the vaporized raw material in the radial direction of the rotation body 50.

Regulating the expansion of the vaporized raw material causes the density of the vaporized raw material heated and excited by the energy beam EB to be higher than that of the case without the groove 55. Accordingly, since the vaporized raw material with a higher density is transformed into plasma, the high-temperature plasma P can be generated efficiently. This makes it possible to improve the density of the high-temperature plasma P, thereby improving the luminous efficiency of the high-temperature plasma P generated by the energy beam EB.

In addition, for example, the solid plasma raw material may need a longer time to be vaporized when irradiated with the energy beam EB. Hence, the raw material may not be sufficiently heated and expanded by the energy beam EB enough to exhibit the above-mentioned effect. Moreover, the solid plasma raw material has difficulty in controlling its layer thickness to form a concave surface in response to the groove. To address this issue, a concave surface is formed on the front surface of the raw material in advance, for example. However, as the solid raw material is consumed, the concave surface formed on the front surface may be deformed, making it difficult to efficiently generate the high-temperature plasma over a long period of time.

Hence, the above effects of providing groove 55 are more pronounced when the plasma raw material 23 to be irradiated with the energy beam EB is a liquid raw material. For example, the shape of the front surface of the plasma raw material 23, which is a liquid raw material, can be controlled at any time. This makes it possible to maintain the high-temperature plasma P with high luminous efficiency for a long period of time.

Configuration Examples of Groove

FIGS. 7A to 7D are schematic diagrams illustrating an example of the cross-sectional shape of the groove. Here, the cross-sectional shape of groove 55 of the rotation main body 51 (rotation body 50) along the radial direction is described. In each of FIG. 7A through FIG. 7D, the left and right direction in the figures corresponds to the radial direction of the rotation main body 51. The incident direction (incident axis IA) of the energy beam EB to each groove 55 can be set to any desired direction.

Figure 7A:
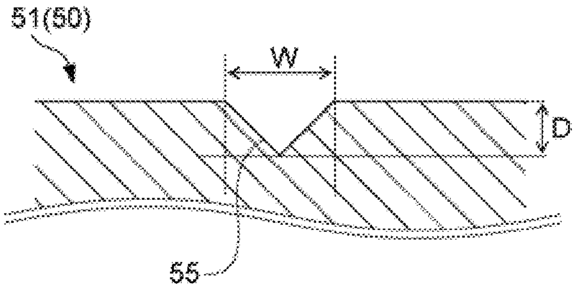
FIG. 7A is a schematic cross-sectional view illustrating an example of a groove.

The groove 55 shown in FIG. 7A is an annular groove with a triangular cross-sectional shape. This is also the cross-sectional shape of the groove 55 shown in FIGS. 1, 4A, 4B, 5A to 5C, and 6B. The triangular-shaped groove 55 is relatively easy to create. The groove 55 is composed of slopes connecting to the front surface 51*a*, which can readily vary the layer thickness in response to the rotation speed of the rotation body 50, for example.

Figure 7B:
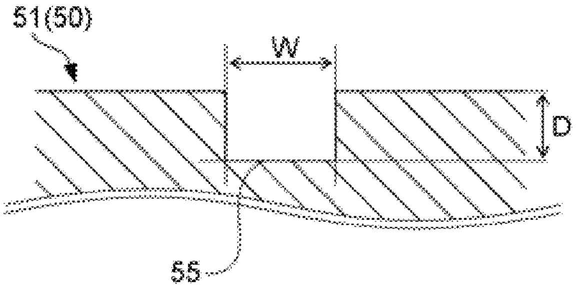
FIG. 7B is a schematic cross-sectional view illustrating another example of the groove.

The groove 55 shown in FIG. 7B is an annular groove with a rectangular cross-sectional shape. The rectangular groove 55 is relatively easy to create. The groove 55 is provided with a bottom face and two side faces facing each other across the bottom surface. These two side faces can sufficiently suppress the expansion of the vaporized plasma raw material 23 in the radial direction, for example.

Figure 7C:
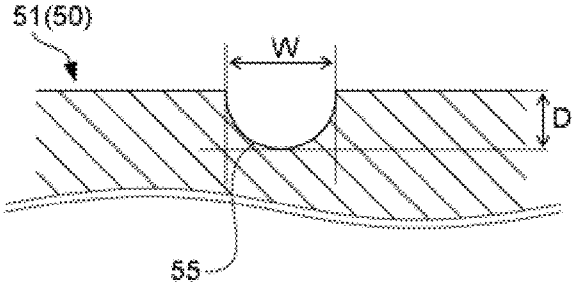
FIG. 7C is a schematic cross-sectional view illustrating yet another example of the groove.

The groove 55 shown in FIG. 7C is an annular groove with an arc cross-sectional shape. In the arc-shaped groove 55, even if the incident angle of the energy beam EB changes along the radial direction of the rotation body 50, for example, the spot shape of the energy beam EB at the inner surface of the groove 55 hardly changes. This allows the incident axis IA of the energy beam EB to be set relatively as desired. In addition, this can prevent the situation of significantly changing the luminous characteristics even when the arrangement of the rotation body 50 is adjusted, for example.

Figure 7D:
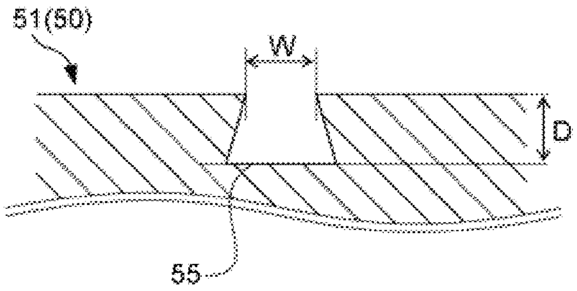
FIG. 7D is a schematic cross-sectional view illustrating yet another example of the groove.

The groove 55 shown in FIG. 7D is an annular groove with a trapezoidal cross-sectional shape having a wide bottom face. This trapezoidal groove 55 has a smaller opening through which the energy beam EB is incident. This structure can sufficiently suppress the expansion of the vaporized plasma raw material 23 in the radial direction. The groove 55 may have any cross-sectional shape other than these configurations.

FIGS. 7A to 7D each illustrate an opening width W of the groove 55 and a depth D of the groove 55 with arrows. Here, the opening width W is a width of the opening in the groove 55 in the radial direction. The depth D is a depth of the deepest portion of the groove 55 from the front surface 51*a*.

The opening width W of the groove 55 is set in a range from 1 to 10 times as large as the spot size of the energy beam EB. The depth D of the groove 55 is approximately set to, for example, the same as the opening width W. Setting the opening width W in such a range is capable of suppressing the direction of expansion of the plasma raw material 23 (vaporized raw material) vaporized by the energy beam EB. The opening width W is preferably set in a range from 3 to 5 times as large as the spot size of the energy beam EB. This makes it possible to align the spot of the energy beam EB with the groove 55 relatively easily and to suppress the expansion of the vaporized raw material reliably.

The diameter of the spot of the energy beam EB is set in a range from 10 μm to 100 μm, for example. In this case, the opening width W is approximately set from 50 μm to 100 μm, for example. Obviously, the opening width W and the depth D of the groove 55 are not limited to this: they may be set appropriately in response to the spot size of the energy beam EB to be used, etc.

FIGS. 8A to 8D is schematic diagrams illustrating the relationship between the cross-sectional shape of the groove and the energy beam. Here, the angle of the energy beam EB with respect to each of the faces constituting the groove 55 is described. Note that the incident direction of the energy beam EB is fixed to each of the groove 55 in FIGS. 8A to 8D.

Figure 8A:
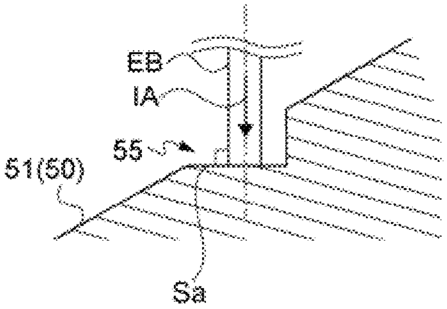
FIG. 8A is a schematic diagram illustrating the relationship between the cross-sectional shape of an example of the groove and an energy beam.

The groove 55 shown in FIG. 8A has a triangular cross-sectional shape. The energy beam EB is incident on one slope Sa constituting the groove 55, and the incident axis IA is orthogonal to the slope Sa. This minimizes the spot size of the energy beam EB projected onto the slope Sa. This enables the plasma raw material 23 distributed along the slope Sa to be irradiated with the energy beam EB at a higher density, thereby fully efficiently generating the high-temperature plasma P.

Figure 8B:
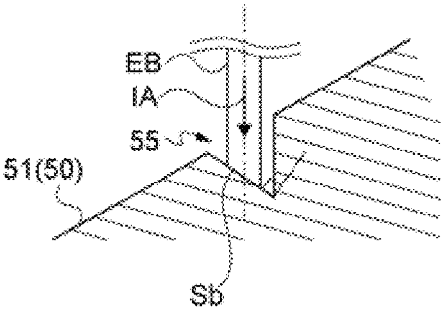
FIG. 8B is a schematic diagram illustrating the relationship between the cross-sectional shape of another example of the groove and the energy beam.

The groove 55 shown in FIG. 8B has a triangular cross-sectional shape. The energy beam EB is obliquely incident onto one slope Sb constituting the groove 55. Hence, the angle formed between the incident axis IA and the slope Sb is less than 90°. The amount of debris released when the plasma raw material 23 is irradiated with the energy beam EB tends to be largest in the normal direction of the rotation body 50 at the incident position. The configuration shown in FIG. 8B indicates that the incident axis IA of the energy beam EB is different from the normal direction of the slope Sb. In other words, this configuration enables the incident direction of the energy beam EB to be separated from the direction in which the amount of debris released is large, thus reducing the amount of debris that reaches the incident chamber 4 shown in FIG. 1, for example.

Figure 8C:
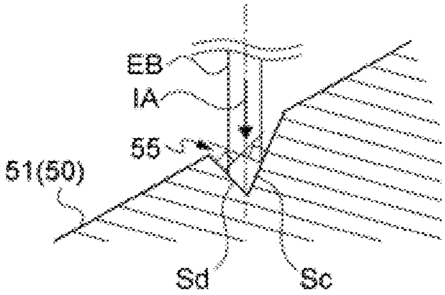
FIG. 8C is a schematic diagram illustrating the relationship between the cross-sectional shape of yet another example of the groove and the energy beam.

The groove 55 shown in FIG. 8C has a triangular cross-sectional shape. The energy beam EB radiates toward the bottom portion of the groove 55 and is obliquely incident onto a slope Sc and a slope Sd that are configured across the bottom portion. The angle formed with the slope Sc and the incident axis IA, and the angle formed with the slope Sd and the incident axis IA are both less than 90°. This configuration allows the front surface of the plasma raw material 23 distributed along the slope Sc and the slope Sd to adequately regulate the expansion of the vaporized raw material, sufficiently increasing the density of the high-temperature plasma P. In addition, the direction in which debris is released is dispersed, making it possible to avoid a situation in which debris is concentrated in only one direction.

Figure 8D:
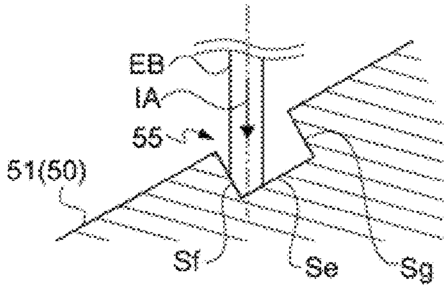
FIG. 8D is a schematic diagram illustrating the relationship between the cross-sectional shape of yet another example of the groove and the energy beam.

The groove 55 shown in FIG. 8D has a rectangular cross-sectional shape. The energy beam EB radiates toward one corner of the groove 55 and is obliquely incident onto a bottom face Se and a side face Sf. This configuration, as is similar to the groove 55 shown in FIG. 8C, for example, allows the front surface of the plasma raw material 23 distributed along the bottom face Se and the side face Sf to adequately regulate the expansion of the vaporized raw material. Furthermore, the presence of the side face Sg facing the side face Sf increases the confining effect of the vaporized raw material. In addition, the side Sg can also reabsorb debris scattered from the side face Sf, for example, thereby reducing the amount of debris released. In addition, the configuration of the groove 55 with respect to the energy beam EB is not limiting and may be set appropriately in response to the luminous efficiency required for the apparatus and the degree of suppressing debris, for example.

Configuration Example of Skimmer

Figure 9A:
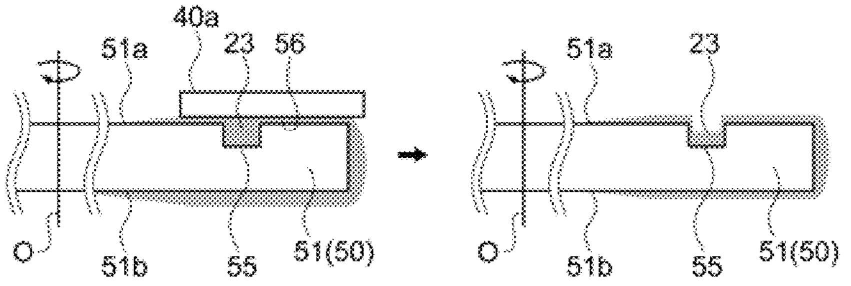
FIG. 9A is a schematic diagram illustrating a configuration example of a skimmer.
Figure 9B:
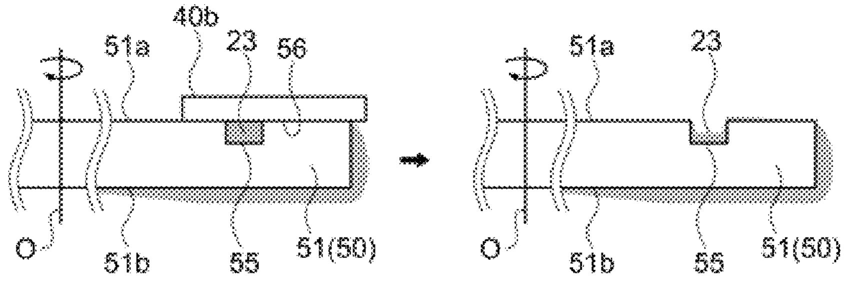
FIG. 9B is a schematic diagram illustrating another configuration example of the skimmer.

FIGS. 9A and 9B are schematic diagrams illustrating other configuration examples of the skimmer. Here, the other configuration examples of the skimmer 40 are described. The left side figures in FIGS. 9A and 9B are schematic cross-sectional views illustrating the state of the rotation body 50 on which the skimmer 40 acts, and the right side figures are schematic cross-sectional views illustrating the state of the rotation body 50 that has passed through the skimmer 40.

In FIG. 9A, a single-sided skimmer 40*a* is used. The skimmer 40*a* is, for example, a plate-shaped or block-shaped member with the adjustment surface 56 on one side. As shown in the left side figures, the skimmer 40*a* is disposed directly above the groove 55 with the adjustment surface 56 facing the front surface 51*a* of the rotation body 50, and with a predetermined spacing between the surface 51*a* and the adjustment surface 56. The skimmer 40*a* serves to skim off the plasma raw material 23 that has been applied near the groove 55, thus adjusting the layer thickness.

After passing through the skimmer 40*a*, the plasma raw material 23 remaining on the rotation body 50 is subjected to centrifugal force to flow toward the outside. As a result, as shown in the right side figure, the shape of the front surface of the plasma raw material 23 directly above the groove 55 forms a concave surface in response to the groove 55. In this way, the single-sided skimmer 40*a* may be used instead of the channel type skimmer 40 described above.

A single-sided skimmer 40*b* shown in FIG. 9B is disposed to be in contact with the front surface 51*a* of the rotation body 50 provided with groove 51*a*. In other words, the skimmer 40*b* is a contact skimmer that is in contact with the rotation body 50. As shown in the left side figure, the skimmer 40*b* is disposed directly above the groove 55 with the adjustment surface 56 being in contact with the front surface 51*a* of the rotation body 50. The rotation of the rotation body 50 in this state allows the skimmer 40*b* to skim off most of the plasma raw material 23 near the groove 55 except the plasma raw material 23 inside the groove 55.

After passing through the skimmer 40*b*, the plasma raw material 23 remaining inside the groove 55 is subjected to centrifugal force, thus part of it flows outside the groove 55 toward the front surface 51*a*. As a result, as shown in the right side figure, the shape of the front surface of the plasma raw material 23 remaining in the groove 55 forms a recessed concave surface along the shape of the groove 55. In this way, the use of the contact type skimmer 40*b* avoids transporting the excessive plasma raw material 23 in the incident area 25 of the energy beam EB, sufficiently suppressing the generation of debris.

Figure 10:
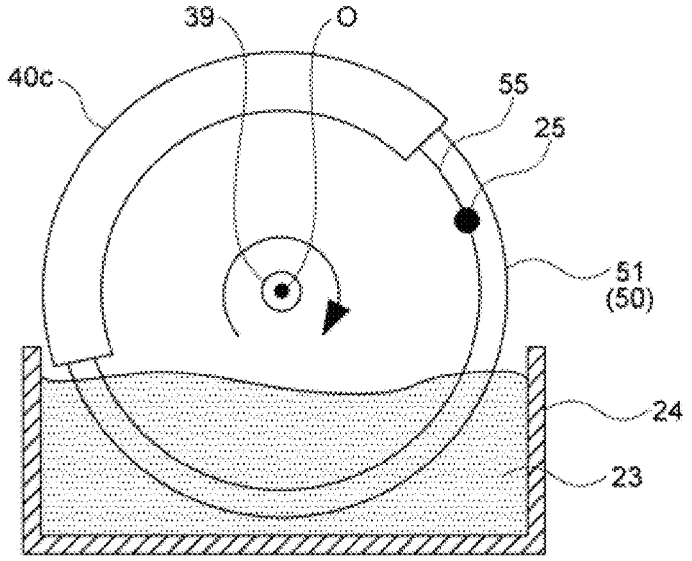
FIG. 10 is a schematic diagram illustrating an example of the planar configuration of the skimmer.

FIG. 10 is a schematic diagram illustrating an example of the planar configuration of the skimmer. A skimmer 40*c* shown in FIG. 10 is provided over a wider area than the skimmer 40 described with reference to the figure such as FIG. 2. The skimmer 40*c* is configured to cover the annular groove 55 from the position from which the plasma raw material 23, which is stored in the container 24, is pulled up to the position in front of the incident area 25 of the energy beam EB.

Here the skimmer 40*c* used here has an arc-shaped planar shape as viewed along the rotation axis O; however, the shape of skimmer 40*c* is not limited to this embodiment as long as it can cover the range described above. The skimmer 40*c* may be a channel type or a single-sided type. The skimmer 40*c* may also be configured as a contact skimmer.

In this way, by enlarging the working surface of the skimmer 40*c*, making the skimmer 40*c* act immediately after the annular groove 55 is pulled up from the plasma material 23, and setting the end of the skimmer 40*c* to be closer to the incident area 25 (plasma generation point) onto which the energy beam EB is incident, these make it easy to control the layer thickness of the plasma raw material at the above-mentioned plasma generation point to the desired layer thickness. The plasma raw material 23 may scatter in the surroundings, for example, when the rotation speed of the rotation body 50 is fast. The use of the skimmer 40*c* sufficiently suppresses the scattering of the plasma raw material 23 even in this case.

Configuration Example of Rotation Body

The above describes the case in which the rotation body is constituted by a single member (rotation main body); however, the rotation body can be constituted by multiple members. Hereinafter, a configuration in which the rotation main body is provided with a cover is described.

Figure 11A:
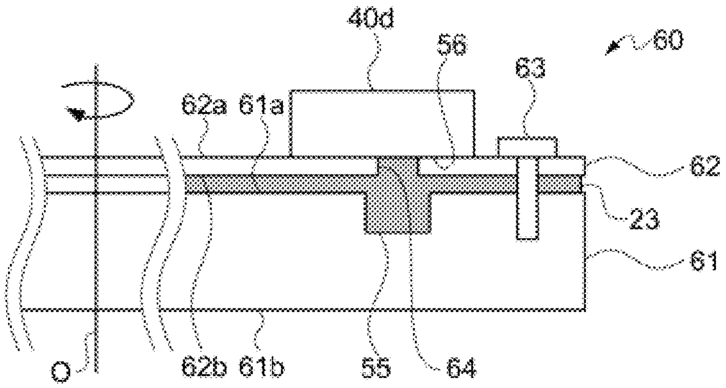
FIG. 11A is a schematic diagram illustrating an example configuration of the rotation body provided with a cover when a skimmer acts on the rotation body.
Figure 11B:
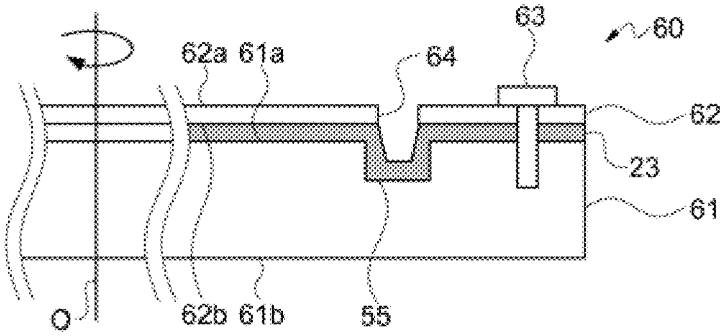
FIG. 11B is a schematic diagram illustrating the example configuration of the rotation body provided with the cover when the rotation body passes through the skimmer.

FIGS. 11A and 11B are schematic diagrams illustrating an example configuration of the rotation body provided with the cover. As shown in FIG. 11A, a rotation body 60 includes a rotation main body 61, a cover 62, and a fixture 63. The skimmer 40*d* is provided in the vicinity of the rotation body 60. FIG. 11A is a schematic cross-sectional view illustrating the state of the rotation body 60 on which the skimmer 40*d* acts, and FIG. 11B is a schematic cross-sectional view illustrating the state of the rotating body 60 after passing through the skimmer 40*d*.

The rotation main body 61 is a disk-shaped member that constitutes the main body of the rotation body 60. The central axis of the rotation main body 61 is the rotation axis O of the rotation body 60. One main surface of the rotation main body 61 is a front surface 61*a* onto which the energy beam EB is incident, and the other main surface is a back surface 61*b*. The groove 55 is formed on the front surface 61*a* of the rotation main body 61. The groove 55 is an annular groove configured in a coaxial manner around the central axis (rotation axis O) of the rotation main body 61. In FIGS. 11A and 11B, the groove 55 having a rectangular cross-sectional shape is formed. Note that the groove 55 may have any cross-sectional shape.

The cover 62 is a plate-shaped member that covers the front surface 61*a* of the rotation main body 61 and is disposed above the surface 61*a* of the rotor body 61 with a predetermined spacing from the front surface 61*a*. Accordingly, a gap is provided between the rotation main body 61 and the cover 62. Hereinafter, the surface of the cover 62 that is opposite to the rotation main body 61 is described as a cover front surface 62*a*, and the other surface of the cover 62, which is opposite to the cover surface 62*a*, is described as a cover back surface 62*b*. The fixture 63 is a member for fixing the cover 62 to the rotation main body 61, for example, screws. In the example shown in FIGS. 11A and 11B, the cover 62 is fixed to the rotation main body 61 by fitting the fixture 63 through the cover 62 into the hole of the rotation main body 61 provided outside of the groove 55.

The cover 62 is provided with an annular opening 64 for allowing the energy beam EB to pass through. The opening 64 is a slit (cut) formed annularly in the cover 62 with a certain width and is arranged to overlap with the groove 55. The opening 64 is configured, for example, as a continuous annular slit over the entire circumference. Then, the cover 62 is divided into a circular member disposed inside and an annular member disposed outside by the opening 64. In this case, the outer member is secured with the fixture 63 described above, and the inner member is secured with other fixtures that are not shown. The opening 64 does not necessarily have to be continuous over the entire circumference; the opening 64 may be configured as an annular slit with partially closed, for example. The width of the opening 64 is set, for example, larger than the spot diameter of the energy beam EB and smaller than the width of the groove 55. In addition, the width of the opening 64 may be set to an appropriate range for the energy beam EB to pass through the groove 55.

As shown in FIG. 11A, the skimmer 40*d* is a contact skimmer. The skimmer 40*d* is disposed to be in contact with the front surface 62*a* of the cover 62 in a manner that the skimmer 40*d* covers the opening 64 of the cover 62. The skimmer 40*d* skims off the plasma material 23 that adheres on the front surface 62*a* in the surroundings of the opening 64. Note that the space between the cover 62 and the rotation main body 61 (i.e., the inside of the opening 64, the gap between the cover 62 and the rotation main body 61, and the inside of the groove 55) is filled with the plasma raw material 23.

After passing through the skimmer 40*d*, the plasma raw material 23 remaining between the cover 62 and the rotation main body 61 flows to the outer periphery of the rotation main body 61 by the centrifugal force. As a result, as shown in FIG. 11B, the shape of the front surface of the plasma raw material 23 disposed directly above the groove 55 (directly below the opening 64) forms a recessed concave surface in response to the shape of groove 55. For example, the plasma raw material 23 remains in the space sandwiched by the front surface 61*a* of the rotation main body 61 and the back surface 62*b* of the cover 62 because the surface tension and other forces from the respective surfaces act on the plasma raw material 23. In contrast, the concave surface is formed in the area directly above groove 55 facing the opening 64 because the surface tension and other forces from the back surface 62*b* fail to act on the plasma raw material 23.

As a result, the expansion of the plasma raw material 23 vaporized by the energy beam EB is regulated by the opening 64 of the cover 62 in addition to the concave surface formed on the front surface of the plasma raw material 23. This makes it possible to confine the vaporized raw material in a sufficiently narrow range and to generate the high-temperature plasma P very efficiently. This enables the luminous efficiency of the high-temperature plasma P to be sufficiently improved.

As described above, the width of the opening 64 is larger than the spot diameter of the energy beam EB and smaller than the width of the groove 55. This improves the effect of confining the vaporized raw material. In addition, this configuration enables the cover 62 to shield debris scattered during the irradiation with the energy beam EB or the like, thereby reducing the amount of debris.

Figure 12:
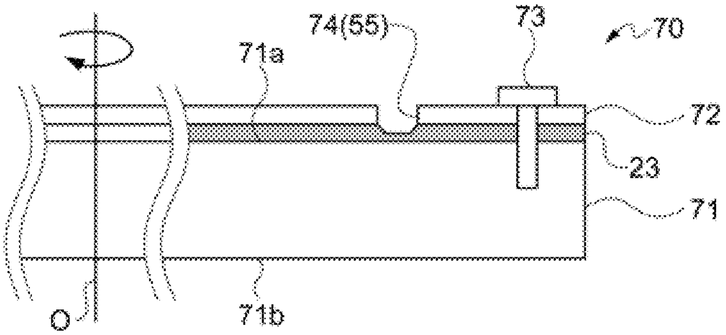
FIG. 12 is a schematic diagram illustrating another example configuration of the rotation body provided with the cover.

FIG. 12 is a schematic diagram illustrating another configuration of the rotation body provided with the cover. In a rotation body 70 shown in FIG. 12, a cover 72 is fixed to a disk-shaped rotation main body 71 using a fixture 73. One main surface of the rotation main body 71 is a front surface 71*a* onto which the energy beam EB is incident, and the other main surface is a back surface 71*b*. The cover 72 is disposed to cover the front surface 71*a* at a predetermined spacing. The cover 72 is provided with an annular opening 74 for allowing the energy beam EB to pass through. The cover 72 is configured in a manner similar to the cover 62 shown in FIGS. 11A and 11B, for example.

In the example shown in FIG. 12, the front surface 71*a*, which is the main surface of the rotation main body 71 above which the cover 72 is disposed is a flat surface. In other words, no annular groove or the like is formed on the front surface 71*a*. In this case, the opening 74 of the cover 72 serves as the groove 55 in the rotation body 70.

In the rotation body 70, a contact skimmer is used to skim off the excessive plasma raw material that adheres on the cover 72, as is similar to that described in FIG. 11A. FIG. 12 schematically illustrates the state of the rotation body 70 after passing through the contact skimmer. After passing through the contact skimmer, the plasma raw material 23 remaining between the rotation main body 71 and the cover 72 flows to the outer periphery of the rotation main body 71 by the centrifugal force. 71. Then, drag (reaction) is generated against the centrifugal force at the portion (wall) facing the plasma raw material 23 of the opening 74, allowing the plasma raw material 23 to be present along the wall portion of the opening 74. Hence, the front surface of the plasma raw material 23 forms a concave surface.

In this way, even when the rotation main body 71 is not provided with the groove 55, this configuration can form a concave surface on the surface of the plasma raw material 23 in response to the opening 74. This makes it possible to regulate the expansion of the plasma raw material 23 vaporized by the energy beam EB. In addition, the manufacturing process can be simplified because there is no need for the groove 55 to be provided in the rotation main body 71.

As described above, in the light source apparatus 1 according to the present embodiment, the rotation body disposed at a position onto which the energy beam EB is incident, is provided with the groove 55 such that the groove 55 overlaps with the incident area 25 of the energy beam EB, and the groove 55 is supplied with the plasma raw material 23. The layer thickness of this plasma raw material 23 is adjusted, and a concave surface is formed, in response to the groove 55, on the front surface of the plasma raw material 23 in the incident area 25 of the energy beam EB. This concave surface regulates the direction of expansion of the plasma raw material 23 when it vaporizes, thereby improving the luminous efficiency of the high-temperature plasma P generated by the energy beam EB.

Other Embodiments

The present invention is not limited to the embodiments described above and can be implemented in various other embodiments.

In the above embodiment, described is the structure in which the main surface of the disk-shaped rotation body, which is a flat portion is irradiated with the energy beam EB, and the groove is provided in the incident area of the energy beam EB in the flat portion. The location of the groove is not limited to the main surface of the rotation body. For example, a configuration in which the rotation body is provided with an inner circumferential face and the plasma raw material is supplied to the inner circumferential face is also conceivable. Here, the inner circumferential face of the rotation body is a face surrounding the rotation axis O of the rotation body and is a rotationally symmetrical curved surface portion around the rotation axis O. In this case, the groove is provided in the inner circumferential face.

Figure 13:
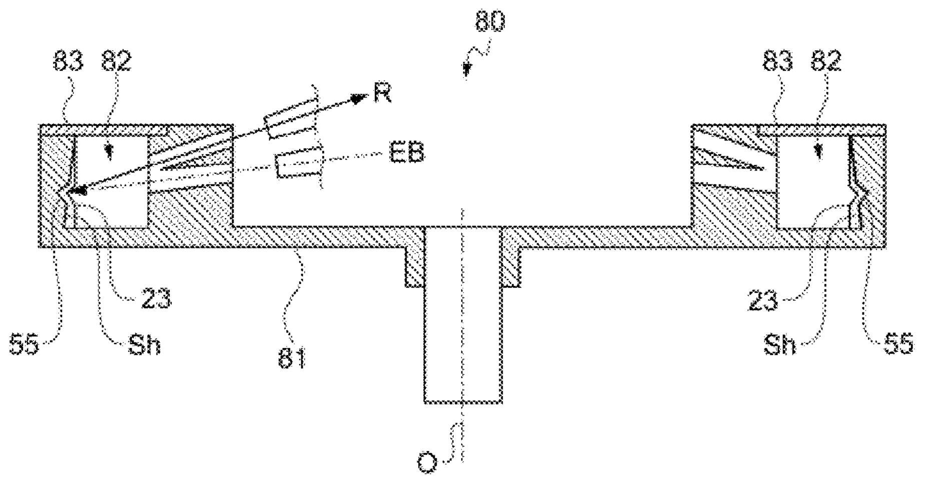
FIG. 13 is a schematic diagram illustrating a configuration example of a rotation body according to another embodiment.
Figure 14:
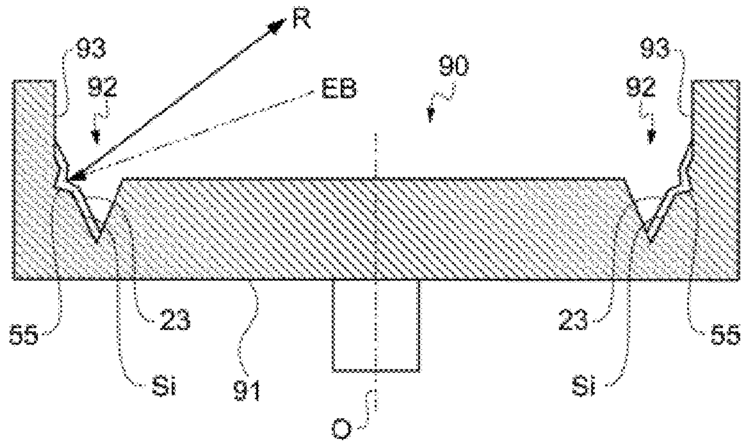
FIG. 14 is a schematic diagram illustrating a configuration example of a rotation body according to yet another embodiment.

FIGS. 13 and 14 are schematic diagrams illustrating configuration examples of the rotation body according to other embodiments. FIGS. 13 and 14 schematically illustrate a cross-sectional view of the rotation body 80 and the rotation body 90 taken along the rotation axis O, respectively. The rotation body 80 and the rotation body 90 are each provided with an inner circumferential face, and the liquid plasma raw material 23 is supplied on the inner circumferential face. The rotation body 80 and the rotation body 90 are typically arranged such that the rotation axis O is in the vertical direction.

In the rotation body 80 shown in FIG. 13, an annular groove 82 is formed on one face of a disk-shaped base body 81. The annular groove 82 is an area surrounded by an outer wall and an inner wall protruding from the base body 81 and closed by a lid 83. The annular groove 82 is used as a space for storing the plasma raw material 23. The inner wall of the annular groove 82 has an incident opening through which the energy beam EB is incident and an emission opening through which the radiation R generated in the annular groove 82 is extracted. In addition, the groove 55 is formed in a side face Sh of the outer wall of the annular groove 82 such that the groove 55 overlaps with the incident area of the energy beam EB. The side face Sh is the inner circumferential face of the rotation body 80.

When the rotation body 80 rotates around the rotation axis O, the plasma raw material 23 stored in the annular groove 82 is distributed in a manner that it is pressed against the outer side face Sh of the annular groove 82. The side surface Sh is inclined toward the rotation axis O. Hence, the plasma raw material 23 tends to accumulate on the bottom of the side face Sh. However, rotating the rotation body 80 at a sufficient rotation speed allows the plasma raw material 23 to be distributed over the entire side face Sh. This makes the front surface of the plasma raw material 23 form a concave surface in response to the groove 55 in the incident area of the energy beam EB.

In the rotation body 90 shown in FIG. 14, a wedge-shaped annular groove 92 is formed on one side of a disk-shaped base body 91. An outer wall 93 constituting a vertical wall connected to the annular groove 92 is formed outside the annular groove 92. The wedge-shaped annular groove 92 is supplied with plasma raw material 23. The energy beam EB is introduced into the annular groove 92 from the rotation axis O. In addition, the groove 55 is formed in an outer side face Si of the annular groove 92 such that it overlaps with the incident area of the energy beam EB. The side face Si is the inner circumferential face of the rotation body 90.

When the rotation body 90 rotates around the rotation axis O, the plasma raw material 23 stored in the annular groove 92 is distributed along the side face Si that is inclined the outside. The plasma raw material 23 spreads from the side face Si toward the outer wall 93. Hence, the rotation body 90 rotating at a sufficient rotation speed allows the layer thickness of the plasma raw material 23 on the side face Si to be sufficiently thin, thus the plasma raw material 23 is distributed along the shape of groove 55. This makes the front surface of the plasma raw material 23 form a concave surface in response to the groove 55 in the incident area of the energy beam EB.

In this way, even when the groove 55 is formed in the inner circumferential face (side face Sh and Si), this configuration can allow the front surface of the plasma raw material 23 on the inner circumferential face to be recessed. This makes it possible to regulate the expansion of the plasma raw material 23 vaporized by the energy beam EB and to generate the high-temperature plasma P efficiently, thereby improving luminous efficiency. Furthermore, a skimmer may be provided directly above the groove 55 to adjust the layer thickness of the plasma raw material on the inner circumferential face. The use of a skimmer for the layer thickness adjustment enables the front surface of the plasma raw material 23 to be readily recessed in response to the shape of the groove 55.

In the present disclosure, words such as "about", "nearly", and "approximately" are suitably used to readily understand the explanation. On the other hand, there is no clear difference between the cases in which these words "about", "nearly", and "approximately" are used and the cases in which they are not used. In other words, in the present disclosure, concepts that define shape, size, position relationship, and state, such as "center", "middle", "uniform", "equal", "same", "orthogonal", "parallel", "symmetrical", "extending", "axial direction", "cylindrical shape", "cylindrical hollow shape", "ring shape", and "annular shape", are concepts including "substantially center", "substantially middle", "substantially uniform", "substantially equal", "substantially same", "substantially orthogonal", "substantially parallel", "substantially symmetrical", "substantially extending", "substantially axial direction", "substantially cylindrical shape", "substantially cylindrical hollow shape", "substantially ring shape", and "substantially annular shape". The concepts also include concepts having states in a predetermined range (e.g., ±10% range) with respect to, for example, "exactly center", "exactly middle", "exactly uniform", "exactly equal", "exactly same", "exactly orthogonal", "exactly parallel", "exactly symmetrical", "exactly extending", "exactly axial direction", "exactly cylindrical shape", "exactly cylindrical hollow shape", "exactly ring shape", "exactly annular shape", and the like. Hence, even when the words such as "about", "nearly", and "approximately" are not added, the concepts may include those that are expressed by adding "about", "nearly", "approximately", and the like. Conversely, states expressed by adding "about", "nearly", "approximately", and the like do not necessarily exclude their exact states.

In the present disclosure, expressions using the term "than" such as "greater than A" and "less than A" are expressions that comprehensively include concepts that include the case that is equal to A and concepts that do not include the case that is equal to A. For example, "greater than A" is not limited to the case where it does not include "equal to A"; however, it also includes "equal to or greater than A". Also, "less than A" is not limited to "less than A"; it also includes "equal to or less than A". Upon the implementation of the present technology, specific settings and other settings are suitably adopted from the concepts that are included in "greater than A" and "less than A" to achieve the effects described above.

Among the characteristic portions according to the present technology described above, it is also possible to combine at least two of the characteristic portions. In other words, the various characteristic portions described in each embodiment may be optionally combined without being restricted to the embodiments. The various effects described above are merely examples and are not limiting; other effects may also be achieved.

What is claimed is:

1. An x-ray or extreme ultraviolet light source apparatus, in which an electron beam or laser beam transforms a liquid raw material into plasma to extract x-ray or extreme ultraviolet radiation, the x-ray or extreme ultraviolet light source apparatus comprising:

a beam source for emitting an electron beam or laser beam;

a rotation body having a main surface perpendicular to a rotational axis and disposed at a position onto which the electron beam or laser beam is incident, and includes a V-shaped groove located in the main surface and overlapping with an incident area of the electron beam or laser beam;

a raw material supply section that supplies the groove with the liquid raw material; and a layer thickness adjustment section configured to adjust a layer thickness of the liquid raw material such that a front surface of the liquid raw material forms a concave surface in response to the V-shaped groove in the incident area of the electron beam or laser beam.

2. The x-ray or extreme ultraviolet light source apparatus according to claim 1, wherein the layer thickness adjustment section includes a skimmer that is fixed at a position directly above the V-shaped groove and independently of the rotation body, and that skims off part of the liquid raw material rotating with the rotation body.

3. The x-ray or extreme ultraviolet light source apparatus according to claim 2, wherein the skimmer includes a member having a channel structure that sandwiches an outer edge of the rotation body.

4. The x-ray or extreme ultraviolet light source apparatus according to claim 2, wherein the skimmer is disposed to be in contact with a front surface of the rotation body provided with the V-shaped groove.

5. The x-ray or extreme ultraviolet light source apparatus according to claim 1, wherein the layer thickness adjustment section includes a rotation controller that controls a drive section that rotates the rotation body.

6. The x-ray or extreme ultraviolet light source apparatus according to claim 1, wherein the rotation body includes a disk-shaped rotation main body and a cover that is disposed at a position with a predetermined spacing from the main surface of the rotation main body, and that includes an annular opening through which the electron beam or laser beam passes.

7. The x-ray or extreme ultraviolet light source apparatus according to claim 1, wherein the rotation body includes an inner circumferential face surrounding a rotation axis thereof, and the V-shaped groove is provided on the inner circumferential face.

8. The x-ray or extreme ultraviolet light source apparatus according to claim 1, further comprising a temperature adjustment mechanism for adjusting the temperature of the plasma raw material, wherein the layer thickness adjustment section includes the temperature adjustment mechanism.

9. An x-ray or extreme ultraviolet light source apparatus, comprising:

a beam source for emitting an electron beam or laser beam to an incident area;

a rotation body disposed at a position onto which the electron beam or laser beam is incident, and includes a groove overlapping with the incident area of the electron beam or laser beam;

a raw material supply section that supplies the rotation body with liquid raw material; and a layer thickness adjustment section including a skimmer and a rotation controller configured to control a rotational speed of the rotation body for adjusting a layer thickness of the liquid raw material, the skimmer located near the raw material supply section removing an excessive amount of the liquid raw material on the rotation body and the rotation controller configured to adjust the rotational speed for causing centrifugal force to form a concave surface on the liquid raw material in the groove approaching the incident area.

10. The x-ray or extreme ultraviolet light source apparatus according to claim 9, wherein the skimmer includes a member having a channel structure that sandwiches an outer edge of the rotation body.

11. The x-ray or extreme ultraviolet light source apparatus according to claim 9, wherein the skimmer is disposed to be in contact with a front surface of the rotation body provided with the groove.

12. The x-ray or extreme ultraviolet light source apparatus according to claim 9, wherein the rotation body includes a disk-shaped rotation main body and a cover that is disposed at a position with a predetermined spacing from a main surface of the rotation main body, and that includes an annular opening through which the electron beam or laser beam passes.

13. The x-ray or extreme ultraviolet light source apparatus according to claim 9, wherein an opening width of the groove is set in a range from 1 to 10 times as large as a spot size of the electron beam or laser beam.

14. The x-ray or extreme ultraviolet light source apparatus according to claim 9, wherein the rotation body includes an inner circumferential face surrounding a rotation axis thereof, and the groove is provided on the inner circumferential face.

15. The x-ray or extreme ultraviolet light source apparatus according to claim 9, further comprising a case that accommodates the rotation body, and that includes an opening through which the electron beam or laser beam and the x-ray or extreme ultraviolet radiation pass.

16. The x-ray or extreme ultraviolet light source apparatus according to claim 9, further comprising a temperature adjustment mechanism for adjusting the temperature of plasma raw material, wherein the layer thickness adjustment section includes the temperature adjustment mechanism.

* * * * *